(12) United States Patent
Reimers et al.

(10) Patent No.: US 10,450,392 B2
(45) Date of Patent: Oct. 22, 2019

(54) POLYMERIZATION PROCESSES USING HIGH MOLECULAR WEIGHT POLYHYDRIC QUENCHING AGENTS

(71) Applicant: ExxonMobil Chemical Patents Inc., Baytown, TX (US)

(72) Inventors: Jay L. Reimers, Houston, TX (US); Brian R. Greenhalgh, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/641,876

(22) Filed: Jul. 5, 2017

(65) Prior Publication Data

US 2018/0030177 A1     Feb. 1, 2018

Related U.S. Application Data

(60) Provisional application No. 62/368,477, filed on Jul. 29, 2016.

(51) Int. Cl.

| | | |
|---|---|---|
| *C08F 210/06* | (2006.01) | |
| *C08F 2/42* | (2006.01) | |
| *C08F 6/00* | (2006.01) | |

(52) U.S. Cl.
CPC .............. *C08F 210/06* (2013.01); *C08F 2/42* (2013.01); *C08F 6/003* (2013.01)

(58) Field of Classification Search
CPC ........... C08F 210/06; C08F 2/42; C08F 6/003
See application file for complete search history.

(56) References Cited

U.S. PATENT DOCUMENTS

| | | | | |
|---|---|---|---|---|
| 3,661,872 | A * | 5/1972 | Short et al. ............... | C08C 2/06 526/340 |
| 5,081,182 | A * | 1/1992 | Robinson .................. | C02F 1/54 524/812 |
| 2005/0250917 | A1* | 11/2005 | Bigiavi ................. | C08F 110/08 526/68 |
| 2006/0160965 | A1* | 7/2006 | Goode .................... | C08F 10/02 526/82 |

FOREIGN PATENT DOCUMENTS

| | | |
|---|---|---|
| EP | 2495297 | 9/2012 |
| EP | 3023439 | 5/2016 |

* cited by examiner

*Primary Examiner* — Peter D. Mulcahy

(57) ABSTRACT

This disclosure describes polymerization processes and processes for quenching polymerization reactions using high molecular weight polyhydric quenching agents.

13 Claims, No Drawings

POLYMERIZATION PROCESSES USING HIGH MOLECULAR WEIGHT POLYHYDRIC QUENCHING AGENTS

PRIORITY CLAIM

This application claims priority to and the benefit of U.S. Ser. No. 62/368,477, filed Jul. 29, 2016 and is incorporated by reference in its entirety.

FIELD OF THE INVENTION

This disclosure describes novel polymerization and quenching processes using high molecular weight polyhydric quenching agents.

BACKGROUND OF THE INVENTION

Polymerization processes for producing polymers, such as polyolefins, typically require quenching agents to prevent further polymerization of the monomers after a designated amount of polymer has been produced. After polymerization, removal of solvents and/or unreacted monomers from final product occurs via a separation and recovery step. The solvents and/or monomers can subsequently be recycled back into the polymerization process. Traditionally, small, polar, protic molecules, such as water and methanol are used as quenching agents. However, use of such quenching agents is problematic because they can partition in all of the effluent streams during the separation and recovery of the polymer and solvent. This may be the case for both liquid-liquid separations and liquid-vapor separations. Consequently, a recycle stream containing separated solvent and/or unreacted monomers may also contain varying amounts of the traditional polar quenching agents, which, if recycled back into the polymerization process, can poison fresh catalyst. Therefore, further processing steps, including use of treater beds and scavengers, are needed to remove the traditional polar quenching agents from a recycle stream. Such further processing steps are undesirable as they increase capital and operating costs. For example, treater beds require frequent regeneration and scavengers are costly. Thus, there is a need in the art for new and improved polymerization processes where quenching of the polymerization reaction can be achieved with quenching agents that do not readily partition along with solvent and/or unreacted monomer into a recycle stream to avoid catalyst poisoning.

SUMMARY OF THE INVENTION

The present disclosure fulfills the need in the art for new and improved polymerization processes by providing polymerization processes and processes for quenching a polymerization reaction where quenching is achieved by high molecular weight polyhydric quenching agents that do not partition into the recycle stream in a signficant amount along with solvent and/or unreacted monomer. In particular, the disclosure relates to a process for producing polymer where the polymerization reaction is quenched using a quenching agent having a molecular weight ($M_n$) greater than about 200 daltons and at least one of (i) a hydrophilic lipophilic balance (HLB) of less than about 20; and (ii) a hydroxyl value of greater than about 100 mg KOH/g. The process comprises first polymerizing a hydrocarbon monomer dissolved in a solvent in the presence of a catalyst system under conditions to obtain an effluent stream comprising a solution of the polymer and the solvent, followed by introducing the quenching agent into the effluent stream. The effluent stream is then separated to produce: a second effluent stream comprising polymer, which is preferably substantially free of the solvent, and the quenching agent; and a recycle stream comprising the solvent, unreacted hydrocarbon monomer and, optionally, the quenching agent. Generally, the second effluent has a higher concentration of the quenching agent than the recycle stream.

In another aspect, this disclosure relates to a process for quenching a polymerization reaction using a quenching agent having a molecular weight ($M_n$) greater than about 200 daltons and at least one of (i) a hydrophilic lipophilic balance (HLB) of less than about 20; and (ii) a hydroxyl value of greater than about 100 mg KOH/g. Generally, the process comprises introducing the quenching agent into an effluent stream comprising polymer exiting a polymerization zone to quench the polymerization reaction. The effluent stream is then separated to produce: a second effluent stream comprising polymer, which is preferably substantially free of the solvent, and the quenching agent; and a recycle stream comprising the solvent, unreacted hydrocarbon monomer and, optionally, the quenching agent. Generally, the second effluent has a higher concentration of the quenching agent than the recycle stream.

DETAILED DESCRIPTION OF THE INVENTION

I. Definitions

For the purposes of this disclosure and the claims thereto, the new numbering scheme for the Periodic Table Groups is used as described in CHEMICAL AND ENGINEERING NEWS, 63 (5), pg. 27, (1985). Therefore, a "Group 4 metal" is an element from Group 4 of the Periodic Table, e.g., Hf, Ti, or Zr.

A "reaction zone" also referred to as a "polymerization zone" is a vessel where polymerization takes place, for example, a batch reactor or continuous reactor. When multiple reactors are used in either series or parallel configuration, each reactor may be considered as a separate reaction zone or a separate polymerization zone. Alternatively, a reactor may include one or more reaction zones or polymerization zones. For a multi-stage polymerization in both a batch reactor and a continuous reactor, each polymerization stage is considered as a separate polymerization zone. "Catalyst productivity" is a measure of how many grams of polymer (P) are produced using a polymerization catalyst comprising W g of catalyst (cat), over a period of time of T hours. Catalyst productivity may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is. Catalyst activity is reported as the mass of product polymer (P) produced per mole of catalyst (cat) used (kgP/molcat).

As used herein, the term "paraffin," alternatively referred to as "alkane," refers to a saturated hydrocarbon chain of 1 to about 25 carbon atoms in length, such as, but not limited to methane, ethane, propane, and butane. The paraffin may be straight-chain or branched-chain. "Paraffin" is intended to embrace all structural isomeric forms of paraffins. As used herein, the term "light paraffin" refers to paraffins having 1 to 4 carbon atoms (i.e., methane, ethane, propane, and butane).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on. For the purposes of this disclosure, ethylene shall be considered an α-olefin.

For purposes of this disclosure and claims thereto, unless otherwise indicated, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity (PDI), is defined to be $M_w$ divided by $M_n$. Unless otherwise noted, all molecular weight units (e.g., $M_w$, $M_n$, $M_z$) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane, dme is 1,2-dimethoxyethane, TMS is trimethylsilyl, TIBAL is triisobutylaluminum, TNOAL is tri(n-octyl)aluminum, THF (also referred to as the is tetrahydrofuran, RT is room temperature (and is 25° C. unless otherwise indicated), tol is toluene, EtOAc is ethyl acetate, Np is neopentyl, and Cy is cyclohexyl.

A "catalyst system" is the combination of at least one catalyst compound, at least one activator, and an optional co-activator. For the purposes of this disclosure and the claims thereto, when catalyst systems are described as comprising neutral stable forms of the components, it is well understood by one of ordinary skill in the art, that the ionic form of the component is the form that reacts with the monomers to produce polymers. When "catalyst system" is used to describe such a catalyst/activator before activation, it means the unactivated catalyst complex (pre-catalyst) together with an activator, support and, optionally, a co-activator. When it is used to describe such after activation, it means the support, the activated complex, and the activator or other charge-balancing moiety. The transition metal compound may be neutral as in a pre-catalyst, or a charged species with a counter ion as in an activated catalyst system.

In the description herein, the metallocene catalyst may be described as a catalyst precursor, a pre-catalyst compound, metallocene catalyst compound, or a transition metal compound, and these terms are used interchangeably. A metallocene catalyst is defined as an organometallic compound bonded to least one π-bound cyclopentadienyl moiety (or substituted cyclopentadienyl moiety) and more frequently two π-bound cyclopentadienyl moieties or substituted cyclopentadienyl moieties bound to a transition metal. Often, the transition metal is a group 4 transition metal, which is bound to at least one substituted or unsubstituted cyclopentadienyl ligand. For purposes of this disclosure and claims thereto in relation to metallocene catalyst compounds, the term "substituted" means that a hydrogen group has been replaced with a hydrocarbyl group, a heteroatom, a heteroatom-containing group or where at least one heteroatom has been inserted within a hydrocarbyl ring. For example, methyl cyclopentadiene (Cp) is a Cp group substituted with a methyl group. Indene and fluorene (and substituted variants thereof) are substituted cyclopentadiene groups. The term "cyclopentadienyl ligand" is used herein to mean an unsaturated cyclic hydrocarbyl ligand that can consist of one ring, or two or more fused or catenated rings, one of which is an aromatic $C_5$ ring. Substituted or unsubstituted cyclopentadienyl ligands, indenyl ligands, and fluorenyl ligands are all examples of cyclopentadienyl ligands. As used herein, indenyl can be considered as cyclopentadienyl with a fused benzene ring attached. Analogously, fluorenyl can be considered as cyclopentadienyl with two benzene rings fused to the five-membered ring on the cyclopentadienyl.

An "anionic ligand" is a negatively charged ligand which donates one or more pairs of electrons to a metal ion. A "neutral donor ligand" is a neutrally charged ligand which donates one or more pairs of electrons to a metal ion.

"Alkoxy" or "alkoxide" refers to —O-alkyl containing from 1 to about 10 carbon atoms. The alkoxy may be straight-chain, branched-chain, or cyclic. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like, including their substituted analogues. Substituted hydrocarbyl radicals are radicals in which at least one hydrogen atom of the hydrocarbyl radical has been substituted with at least one heteroatom or heteroatom-containing group, such as halogen (such as Br, Cl, F, or I) or at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be, optionally, substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "aryl" or "aryl group" means a six-carbon aromatic ring and the substituted variants thereof, including but not limited to, phenyl, 2-methyl-phenyl, xylyl, 4-bromoxylyl. Likewise, heteroaryl means an aryl group where a ring carbon atom (or two or three-ring carbon atoms) has been replaced with a heteroatom, preferably N, O, or S. As used herein, the term "aromatic" also refers to pseudoaromatic heterocycles, which are heterocyclic substituents that have similar properties and structures (nearly planar) to aromatic heterocyclic ligands, but are not by definition aromatic; likewise the term "aromatic" also refers to substituted aromatics.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family Likewise, reference to an alkyl, alkenyl, alkoxide, or aryl group without specifying a particular isomer (e.g., butyl), expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "continuous" means a system that operates without interruption or cessation. For example, a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends. A solution polymerization is typically homogeneous. A homogeneous polymerization process is defined to be a process where at least 90 wt % of the product is soluble in the reaction media. Such systems are preferably not turbid as described in J. Vladimir Oliveira, C. Dariva and J. C. Pinto, Ind. Eng. Chem. Res., 29, 2000, p. 4627.

A "bulk polymerization" means a polymerization process in which the monomers and/or comonomers being polymerized are used as a solvent or diluent using little or no inert solvent as a solvent or diluent. A small fraction of inert solvent might be used as a carrier for a catalyst and a scavenger. A bulk polymerization system contains less than 25 wt % of inert solvent or diluent, preferably less than 10 wt %, preferably less than 1 wt %, preferably 0 wt %.

II. Polymerization Process
A. Polymerizing Step

This disclosure relates to a polymerization process for forming polymer (e.g., polyolefin) comprising polymerizing a hydrocarbon monomer in the presence of a catalyst system under conditions to obtain a first effluent comprising polymer (e.g., polyolefin). The polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous. Homogeneous polymerization processes (such as solution phase and bulk phase processes) are advantageous. A bulk process is defined to be a process where monomer concentration in all feeds to the reactor is 70 vol % or more. In useful bulk polymerization systems, no solvent or diluent is present or added in the reaction medium, (except for the small amounts used as the carrier for the catalyst system or other additives, or amounts typically found with the monomer, e.g., propane in propylene).

Alternately, the polymerization process is a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent). A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension, including diluent, is intermittently or continuously removed from the reactor where the volatile components are separated from the polymer and recycled, optionally, after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

One aspect of the processes and systems disclosed herein involves a particle form polymerization, or a slurry process where the temperature is kept below the temperature at which the polymer goes into solution. Such technique is well known in the art and described in, for instance, U.S. Pat. No. 3,248,179; which is fully incorporated herein by reference. The preferred temperature in the particle form process is within the range of about 85° C. to about 110° C.

Advantageously, the polymerization process may be a solution polymerization process wherein the monomer and catalyst system are contacted in a solution phase and polymer is obtained therein. In various aspects, a solvent may be present during the polymerization process. Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. Preferably, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. Alternatively, the solvent is not aromatic, preferably aromatics are present in the solvent at less than 1 wt %, preferably less than 0.5 wt %, preferably 0 wt % based upon the weight of the solvents. Preferably, the feed concentration of the monomers and comonomers for the polymerization is 60 vol % solvent or less, preferably 40 vol % or less, or preferably 20 vol % or less, based on the total volume of the feedstream. In various aspects where the polymerization process is a solution polymerization, the process may comprise polymerizing a hydrocarbon monomer dissolved in a solvent as described herein in the presence of a catalyst system under conditions to obtain a first effluent comprising a solution of polymer (e.g., polyolefin) and solvent and/or unreacted hydrocarbon monomer.

The polymerization processes may be conducted under conditions including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 to about 1800 psi (830 to 12000 kPa), preferably from 200 to 1000 psi (1400 to 6900 kPa), preferably from 300 to 600 psi (2100 to 4100 kPa). Preferably, the pressure is about 450 psi (3100 kPa). Often, hydrogen may be present during the polymerization process at a partial pressure of 0.001 to 50 psig (0.007 to 350 kPa gauge (kPag)), preferably from 0.01 to 25 psig (0.07 to 170 kPag), more preferably 0.1 to 10 psig (0.7 to 70 kPag).

B. Quenching the Polymerization

Once a suitable amount of polymer is produced, a quenching agent may be added to the first effluent stream in order to prevent further polymerization, i.e., quench the polymerization reaction. In various aspects, it is desirable to use a polyhydric quenching agent with a high molecular weight.

The molecular weights specified in this invention are defined as conventional number-average molecular weights. The molecular weight of a given quench agent is measured using a Waters gel permeation chromatograph equipped with Waters 2487 dual λ absorbance detector, a Waters 2414 refractive index detector, and two Waters Styragel™ HR 1 THF columns, where the flow rate of the tetrahydrofuran eluent is 1 mL/min at 40° C. Polystyrene standards (purchased from Waters) with narrow molecular weight distributions may be used for molecular weight calibration and, therefore, the molecular weight results are relative molecular weights. Suitable polystyrene standards are of molecular weight of $0.93 \times 10^3$, $1.05 \times 10^3$, $1.26 \times 10^3$, $1.31 \times 10^3$, $1.99 \times 10^3$, $2.97 \times 10^3$, $3.37 \times 10^3$, $4.49 \times 10^3$, $4.92 \times 10^3$, and $5.03 \times 10^3$ Daltons.

The quenching agent may have a molecular weight ($M_n$) of greater than or equal to about 200 daltons, greater than or equal to about 250 daltons, greater than or equal to about 320 daltons, greater than or equal to about 350 daltons, greater than or equal to about 400 daltons, greater than or equal to about 450 daltons, greater than or equal to about 500 daltons, greater than or equal to about 550 daltons, greater than or equal to about 600 daltons, greater than or equal to about 650 daltons, greater than or equal to about 700 daltons, greater than or equal to about 750 daltons, greater than or equal to about 800 daltons, greater than or equal to about 850 daltons, greater than or equal to about 900 daltons, greater than or equal to about 950 daltons, greater than or equal to about 1000 daltons, greater than or equal to about 2000 daltons, or greater than or equal to about 3000 daltons. In particular, the quenching agent may have a molecular weight ($M_n$) of greater than or equal to about 200 daltons, greater than or equal to about 300 daltons, greater than or equal to about 500 daltons or greater than or equal to about 600 daltons.

Additionally or alternatively, the quenching agent may have a molecular weight ($M_n$) of about 200 daltons to about 3000 daltons, about 200 daltons to about 1000 daltons, about 300 daltons to about 950 daltons, or about 500 daltons to about 900 daltons. Further, to ensure miscibility of the quenching agent with the polymer and solvent in the first effluent stream, the quenching agent may have a hydrophilic-lipophilic balance (HLB) of less than or equal to about 25, less than or equal to about 20, less than or equal to about 18, less than or equal to about 15, less than or equal to about 12, less than or equal to about 10, less than or equal to about 7, less than or equal to about 5, or less than or equal to about 3. HLB may be determined as described in Davies J T (1957), "A quantitative kinetic theory of emulsion type I. Physical chemistry of the emulsifying agent," *Gas/Liquid and Liquid/Liquid Interface* (*Proceedings of the International Congress of Surface Activity*), pp. 426-38. In particular, the quenching agent may have a HLB of less than or equal to about 20, less than or equal to about 18, less than or equal to about 15, or less than or equal to about 10. Additionally or alternatively, the quenching agent may have a HLB of about 3 to about 25, about 5 to about 20, about 5 to about 15, or about 5 to about 10.

Additionally or alternatively, the quenching agent may have a hydroxyl value of greater than or equal to about 75 mg KOH/g, greater than or equal to about 100 mg KOH/g, greater than or equal to about 150 mg KOH/g, greater than or equal to about 200 mg KOH/g, greater than or equal to about 250 mg KOH/g, greater than or equal to about 300 mg KOH/g, greater than or equal to about 350 mg KOH/g, greater than or equal to about 400 mg KOH/g, greater than or equal to about 450 mg KOH/g, or greater than or equal to about 500 mg KOH/g. Hydroxyl value may be determined according to ASTM Method D1957. In particular, the quenching agent may have a hydroxyl value of greater than or equal to about 100 mg KOH/g, greater than or equal to about 150 mg KOH/g, greater than or equal to about 200 mg KOH/g, greater than or equal to about 250 mg KOH/g, or greater than or equal to about 300 mg KOH/g. Additionally or alternatively, the quenching agent may have a hydroxyl value of about 75 mg KOH/g to about 500 mg KOH/g, about 100 mg KOH/g to about 500 mg KOH/g, about 150 mg KOH/g to about 500 mg KOH/g, or about 200 mg KOH/g to about 500 mg KOH/g.

In any embodiment, the quenching agent may have a molecular weight ($M_n$) greater than about 200 daltons, greater than or equal to about 250 daltons, greater than or equal to about 500 daltons, or greater than or equal to about 600 daltons; and at least one of:
(i) a hydrophilic lipophilic balance (HLB) of less than about 20, less than about 18, less than about 15, or less than about 10; and
(ii) a hydroxyl value of greater than about 100 mg KOH/g, greater than or equal to about 150 mg KOH/g, greater than or equal to about 200 mg KOH/g, greater than or equal to about 250 mg KOH/g, or greater than or equal to about 300 mg KOH/g.

Additionally or alternatively, the quenching agent may have both(i)-(ii).

Suitable quenching agents include, but are not limited to fatty acid esters of polyglycerol, fatty acid esters of polyols, fatty acid alkylolamides or combinations thereof. Suitable fatty acid components of the fatty acid esters of polyglycerol, the fatty acid esters of polyols and the fatty acid alkylolamides may have from 8 to 20 carbon atoms, such as, but not limited to oleic acid, stearic acid, and palmitic acid. Examples of suitable polyol components of the fatty acid ester include, but are not limited to, sorbitol and glycerol. The alkylolamide component of the fatty acid alkylolamide may be derived from alkylolamines, such as, but not limited to, ethanolamine and diethanolamine Examples of suitable fatty acid esters of polyglycerol include, but are not limited to, decaglycerol tetraoleate, decaglycerol dipalmate, hexaglycerol distearate, and a combination thereof. Examples of suitable fatty acid esters of polyols include, but are not limited to, sorbitan monooleate, glycerol monooleate, decaglycerol tetraoleate, and a combination thereof. Examples of suitable fatty acid alkylolamides include, but are not limited to, oleic acid diethanolamide.

Additionally or alternatively, the quenching agent may be added to the first effluent stream in an amount based on the total concentration of the first effluent stream of less than or equal to about 1000 wppm, less than or equal to about 750 wppm, less than or equal to about 500 wppm, less than or equal to about 250 wppm, less than or equal to about 100 wppm, less than or equal to about 50 ppm, or less than or equal to about 10 ppm.

Additionally or alternatively, the quenching agent may be added to the first effluent stream in an amount on the total concentration of the first effluent stream of about 100 wppm to about 1000 wppm, about 100 wppm to about 750 wppm, or about 250 wppm to about 500 wppm.

C. Separation of the First Effluent Stream

The solvent and/or unreacted hydrocarbon monomer present in the first effluent with polymer (e.g., polyolefin) requires removal from the first effluent. Thus, the process described herein comprises performing at least one separation step on the first effluent stream. In particular, a separation step may be performed in a first vessel on the first effluent stream under suitable conditions to produce a second effluent stream and a recycle stream. The separation may be performed in any suitable vessel, e.g., a flash vessel, high pressure flash vessel, etc. As discussed above, when using traditional quenching agents (e.g., water, methanol), a non-negligible amount of those traditional quenching agents can remain in the recycle stream following separation of the first effluent stream, which can subsequently poison fresh catalyst if not removed. Consequently, further removal steps (e.g., treater beds, scavengers) are necessary to remove the quenching agent from the recycle stream resulting in added capital and operating costs.

Advantageously, the quenching agents described herein are present primarily in the second effluent stream rather than the recycle stream following separation. In particular, the second effluent stream may comprise polymer (e.g., polyolefin), which is substantially free of the solvent, and the quenching agent.

The recycle stream may comprise the solvent and unreacted hydrocarbon monomer. Preferably, the recycle stream is substantially free of the quenching agent. Optionally, the recycle stream may comprise the quenching agent in an insubstantial amount. Preferably, the second effluent stream has a higher concentration of the quenching agent than the recycle stream. For example, the quenching agent may be present in the second effluent stream in an amount based on the total concentration of the second effluent stream of at least about 100 wppm, at least about 500 wppm, at least about 1000 wppm, at least about 2000 wppm or at least about 3000 wppm. Additionally or alternatively, the quenching agent may be present in the second effluent stream in an amount based on the total concentration of the second effluent stream of about 100 wppm to about 3000 wppm, about 500 wppm to about 3000 wppm, or about 1000 wppm to about 3000 wppm. If present in the recycle stream, the quenching agent may be present in an amount based on the total concentration of the recycle stream of less than about 10 wppm, less than about 7.0 wppm, less than about 5.0 wppm, less than about 2.0 wppm, less than about 1.0 wppm, less than about 0.10 wppm, or less than about 0.010 wppm. In particular, the quenching agent may be present in an amount based on the total concentration of the recycle stream of less than about 5.0 wppm, less than about 1.0 wppm or less than about 0.10 wppm. Additionally or alternatively, the quenching agent may be present in an amount based on the total concentration of the recycle stream of about 0.010 wppm to about 10 wppm, about 0.010 wppm to about 5.0 wppm, or about 0.010 wppm to about 1.0 wppm.

In various aspects, the separation step can be performed as a liquid-liquid separation to produce a liquid phase second effluent stream and a liquid phase recycle stream. Alternatively, the separation step can be performed as a vapor liquid separation to produce a liquid phase second effluent stream and a vapor phase recycle stream.

A liquid-liquid separation may be conducted under conditions including a temperature of from about 150° C. to about 300° C., preferably about 150° C. to about 250° C., preferably about 170° C. to about 230° C., or preferably about 180° C. to about 210° C. Additionally or alternatively, the liquid-liquid separation may be conducted with a pressure of about 375 psig to about 650 psig (2600 to 4500 kPag), preferably about 400 psig to about 600 psig (2800 to 4100 kPag), or preferably about 400 psig to about 500 psig (2800 to 3400 kPag).

A liquid-vapor separation may be conducted under conditions including a temperature of from about 60° C. to about 200° C., preferably about 70° C. to about 180° C., preferably about 80° C. to about 170° C., or preferably about 80° C. to about 150° C. Additionally or alternatively, the liquid-vapor separation may be conducted with a pressure of about 40 psig to about 350 psig (280 to 2400 kPag), preferably about 50 psig to about 300 psig (340 to 2100 kPag), preferably about 70 psig to about 200 psig (480 to 1400 kPag), or preferably about 80 psig to about 150 psig (550 to 1000 kPag).

Often, where a liquid-liquid separation is performed, the quenching agent may have a molecular weight ($M_n$) greater than or equal to about 500 daltons or greater than or equal to about 600 daltons; and at least one of:
(i) a hydrophilic lipophilic balance (HLB) of less than about 15 of less than about 10; and
(ii) a hydroxyl value of greater than or equal to about 150 mg KOH/g or greater than or equal to about 200 mg KOH/g.

Additionally or alternatively, the quenching agent may have both (i)-(ii).

Often, where a liquid-vapor separation is performed, the quenching agent may have a molecular weight ($M_n$) greater than or equal to about 250 daltons or greater than or equal to about 300 daltons; and at least one of:
(i) a hydrophilic lipophilic balance (HLB) of less than about 18 or less than about 15; and
(ii) a hydroxyl value of greater than or equal to about 250 mg KOH/g or greater than or equal to about 300 mg KOH/g.

Additionally or alternatively, the quenching agent may have both (i)-(ii).

D. Recycle

Often, the process described herein may further comprise recycling at least a portion of the recycle stream to be added during the polymerization step. Advantageously, recycling of the recycle stream may not include further processing to remove the quenching agent prior to addition during the polymerization step. Further processing to removing quenching agent includes, but is not limited to, use of treater beds and/or scavengers known in the art.

Optionally, at least a portion of polymer (e.g., polyolefin) may be recycled back to the polymerization step. Polymer (e.g., polyolefin) may be produced with a recycle ratio of at least about 2, at least about 5, at least about 10, at least about 15, at least about 20, at least about 25, at least about 30, at least about 35, at least about 40, at least about 45, at least about 50, at least about 55, or at least about 60. Preferably, polymer (e.g., polyolefin) may be produced with a recycle ratio of at least about 5, at least about 20 or at least about 50. Preferably, polymer (e.g., polyolefin) may be produced with a recycle ratio of about 2 to about 60, preferably about 5 to about 50, preferably about 6 to about 35, preferably about 8 to about 20.

E. Monomers

Hydrocarbon monomers useful herein include substituted or unsubstituted $C_2$ to $C_{40}$ olefins, preferably $C_2$ to $C_{20}$ olefins, preferably $C_2$ to $C_{12}$ olefins, preferably $C_2$ to $C_5$ olefins, preferably $C_2$ to $C_4$ olefins, preferably ethylene, propylene, butene, pentene, hexene, heptene, octene, nonene, decene, undecene, dodecene, and isomers thereof. Other suitable hydrocarbon monomers include $C_1$ to $C_{40}$ paraffins, preferably $C_1$ to $C_{20}$ paraffins, preferably $C_1$ to $C_{12}$ paraffins, preferably $C_1$ to $C_5$ paraffins, preferably $C_1$ to $C_4$ paraffins, preferably methane, ethane, propane, butane, pentane, and isomers thereof. In particular, the hydrocarbon monomer can comprise $C_2$ to $C_{40}$ olefins and/or $C_1$ to $C_4$ paraffins.

Often, the hydrocarbon monomer comprises propylene and, optional, comonomers comprising one or more $C_2$ olefin (ethylene) or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may, optionally, include heteroatoms and/or one or more functional groups. In particular, the hydrocarbon monomer comprises ethylene and/or propylene.

Alternatively, the hydrocarbon monomer comprises ethylene and, optional, comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_2$ to $C_{40}$ olefin monomers and, optional, comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Preferably, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. Often, 500 ppm or less of diene is added to the polymerization, preferably 400 ppm or less, or preferably 300 ppm or less. Alternatively, at least 50 ppm of diene is added to the polymerization, or 100 ppm or more, or 150 ppm or more.

Useful diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene, or higher ring containing diolefins, with or without substituents at various ring positions.

F. Polymers

This disclosure also describes polymer compositions of matter produced by the methods described herein. Preferably, a process described herein produces homopolymers and copolymers of one, two, three, four or more $C_2$ to $C_{40}$ olefin monomers, preferably $C_2$ to $C_{20}$ alpha olefin monomers. Particularly useful monomers include ethylene, propylene, butene, pentene, hexene, heptene, octene, nonene, decene, undecene, dodecene, isomers thereof, and mixtures thereof.

Likewise, the processes of this disclosure produce olefin polymers, preferably polyethylene and polypropylene homopolymers and copolymers. Preferably, the polymers produced are homopolymers of ethylene or homopolymers of propylene In particular, the polymer comprises polyethylene and/or polypropylene.

Alternately, the polymers produced herein are copolymers of a $C_2$ to $C_{40}$ olefin and one, two, or three or more different $C_2$ to $C_{40}$ olefins, (where the $C_2$ to $C_{40}$ olefins are preferably $C_3$ to $C_{20}$ olefins, preferably $C_3$ to $C_{12}$ alpha-olefin, preferably propylene, butene, hexene, octene, decene, dodecene, preferably propylene, butene, hexene, octane, or a mixture thereof). Alternately, the polymers produced herein are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene). Alternately, the polymers produced herein are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomers (preferably ethylene or $C_4$ to $C_{12}$ alpha-olefin, preferably ethylene, butene, hexene, octene, decene, dodecene, preferably ethylene, butene, hexene, octene).

Typically, the polymers produced herein have a $M_w$ of 5,000 to 1,000,000 g/mol (preferably 25,000 to 750,000 g/mol, preferably 50,000 to 500,000 g/mol), and/or a $M_w/M_n$ of greater than 1 to 40 (alternately 1.2 to 20, alternately 1.3 to 10, alternately 1.4 to 5, 1.5 to 4, alternately 1.5 to 3). Preferably, a polymer produced herein has a unimodal or multimodal molecular weight distribution as determined by Gel Permeation Chromatography (GPC). As used herein, "unimodal" means that the GPC trace has one peak or inflection point; "multimodal" means that the GPC trace has at least two peaks or inflection points. An inflection point is that point where the second derivative of the curve changes in sign (e.g., from negative to positive or vice versa). Unless otherwise indicated $M_w$, $M_n$, and MWD may be determined by GPC as described in US 2006/0173123, pages 24 and 25, paragraphs [0334] to [0338].

Preferably, the polymer (e.g., polyolefin) produced herein has a composition distribution breadth index (CDBI) of 50% or more, preferably 60% or more, preferably 70% or more. CDBI is a measure of the composition distribution of monomer within the polymer chains and is measured by the procedure described in WO 93/03093, published Feb. 18, 1993, specifically columns 7 and 8, as well as in Wild et al. (1982) *J. Poly. Sci., Poly. Phys. Ed.* 20:441, and U.S. Pat. No. 5,008,204, including that fractions having a weight average molecular weight ($M_w$) below 15,000 are ignored when determining CDBI. In various aspects, polymer (e.g., polyolefin) may be produced at a rate of ≥about 1 pound per hour per gallon of reactor volume, ≥about 2 pounds per hour per gallon of reactor volume, ≥about 4 pounds per hour per gallon of reactor volume, ≥about 6 pounds per hour per gallon of reactor volume, or ≥about 8 pounds per hour per gallon of reactor volume. Preferably, polymer (e.g., polyolefin) is produced at a rate of ≥about 1 pound per hour per gallon of reactor volume, ≥about 6 pounds per hour per gallon of reactor volume, or ≥about 8 pounds per hour per gallon of reactor volume. Ranges expressly disclosed include combinations of any of the above-enumerated values, e.g., about 1 to about 8 pounds per hour per gallon of reactor volume, about 2 to about 8 pounds per hour per gallon of reactor volume, about 4 to about 8 pounds per hour per gallon of reactor volume, etc. Preferably, polymer (e.g., polyolefin) is produced at a rate of about 1 to about 8 pounds per hour per gallon of reactor volume.

The polymers may be stabilized and formed into pellets using conventional equipment and methods, such as by mixing the polymer and a stabilizer (such as antioxidant) together directly in a mixer (e.g., a single or twin-screw extruder) and then pelletizing the combination. Additionally, additives may be included in the pellets. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

G. Polymer Blends

Often, the polymer (preferably the polyethylene or polypropylene) produced is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Preferably, the polymer (preferably the polyethylene or polypropylene) is present in the above blends, from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %. These blends may be produced by mixing the polymers with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

H. Films

Specifically, any of the foregoing polymers, such as the foregoing polypropylenes or blends thereof, may be used in a variety of end-use applications. Such applications include, for example, mono- or multi-layer blown, extruded, and/or shrink films These films may be formed by any number of well-known extrusion or coextrusion techniques, such as a blown bubble film processing technique, wherein the composition can be extruded in a molten state through an annular die and then expanded to form a uniaxial or biaxial orientation melt prior to being cooled to form a tubular, blown film, which can then be axially slit and unfolded to form a flat film Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or double bubble processes and may occur before or after the individual layers are brought together. For example, a polyethylene layer can be extrusion coated or laminated onto an oriented polypropylene layer or the polyethylene and polypropylene can be coextruded together into a film, then oriented. Likewise, oriented polypropylene can be laminated to oriented polyethylene, or oriented polyethylene can be coated onto polypropylene, then, optionally, the combination could be oriented even further. Typically, the films are oriented in the Machine Direction (MD) at a ratio of up to 15, preferably between 5 and 7, and in the Transverse Direction (TD) at a ratio of up to 15, preferably between 7 to 9. However, alternatively, the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

Often, one or more layers may be modified by corona treatment, electron beam irradiation, gamma irradiation, flame treatment, or microwave. Preferably, one or both of the surface layers is modified by corona treatment.

I. Catalyst System

The catalyst system used in the polymerization process described herein may comprise a catalyst (e.g., olefin polymerization catalyst compound, such as metallocene compound, Ziegler-Natta catalyst, post-metallocene compound, etc.) and an activator. The catalyst (e.g., olefin polymerization catalyst compound, such as metallocene compound, Ziegler-Natta catalyst, post-metallocene compound, etc.) and activator may be combined in any order. For example, the catalyst (e.g., olefin polymerization catalyst compound, such as metallocene compound, Ziegler-Natta catalyst, post-metallocene compound, etc.) and the activator may be combined prior to contacting the monomer. Alternatively, the activater may be added to a solution of the monomer and the catalyst (e.g., olefin polymerization catalyst compound, such as metallocene compound, Ziegler-Natta catalyst, post-metallocene compound, etc.). Preferably, the activator and catalyst (e.g., olefin polymerization catalyst compound, such as metallocene compound, Ziegler-Natta catalyst, post-metallocene compound, etc.) are contacted to form the catalyst system prior to entering a reaction zone. As used herein, "immediately" refers to a period of time of about 1 to about 120 seconds, preferably of about 1 to about 60 seconds, preferably about 1 to 30 seconds before the activator and the catalyst (e.g., olefin polymerization catalyst compound, such as metallocene compound, pyridyldiamido compound, etc.) enter a reaction zone. Additionally or alternatively, the activator may be introduced to a recycle stream comprising the monomer, the catalyst system and the polymer.

Any pre-catalyst compound (catalyst precursor compound) that can produce the desired polymer species may be used in the processes and systems disclosed herein. Suitable pre-catalyst/catalyst precursor compounds include—by way of non-limiting examples—metallocene transition metal compounds (containing one, or two cyclopentadienyl ligands per metal atom), non-metallocene early transition metal compounds (including those with amide and/or phenoxide type ligands), non-metallocene late transition metal compounds (including those with diimine or diiminepyridyl ligands), non-metallocene catalyst compounds described in WO 03/040095; WO 03/040201; WO 03/040233; and WO 03/040442, and other transition metal compounds. Suitable catalysts for use in the processes and systems described herein include any suitable coordination catalyst, such as a metallocene compound, constrained geometry catalyst, post-metallocene compound, Ziegler-Natta catalyst and combinations thereof.

1. Metallocene Compounds

Representative metallocene-type compounds useful herein are represented by the formula:

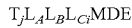

$$T_jL_AL_BL_{Ci}MDE$$

where, M is a group 3, 4, 5, or 6 transition metal atom, or a lanthanide metal atom, or actinide metal atom, preferably a group 4 transition metal atom selected from titanium, zirconium or hafnium; $L_A$, an ancillary ligand, is a substituted or unsubstituted monocyclic or polycyclic arenyl pi-bonded to M; $L_B$ is a member of the class of ancillary ligands defined for $L_A$, or is J, a heteroatom ancillary ligand bonded to M through the heteroatom; the $L_A$ and $L_B$ ligands may be covalently bridged together through a bridging group, T, containing a group 14, 15, or 16 element or boron wherein j is 1 if T is present and j is 0 if T is absent (j equals 0 or 1); $L_{Ci}$ is an optional neutral, non-oxidizing ligand having a dative bond to M (i equals 0, 1, 2, or 3); and, D and E are independently mono-anionic labile ligands, each having a sigma-bond to M, optionally bridged to each other or to $L_A$, $L_B$, or $L_C$.

As used herein, the term "monocyclic arenyl ligand" is used herein to mean a substituted or unsubstituted monoanionic $C_5$ to $C_{100}$ hydrocarbyl ligand 5 that contains an aromatic five-membered single hydrocarbyl ring structure (also referred to as a cyclopentadienyl ring).

As used herein, the term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl or heteroatom substituted hydrocarbyl ring structures which may be fused to additional saturated, partially unsaturated, or aromatic hydrocarbyl or heteroatom substituted hydrocarbyl rings. Cyclopentadienyl ligands, indenyl ligands fluorenyl ligands, tetrahydroindenyl ligands, cyclopenta[b]thienyl ligands, and cyclopenta[b]pyridyl ligands are all examples of arenyl ligands.

Non-limiting examples of $L_A$ include substituted or unsubstituted cyclopentadienyl ligands, indenyl ligands, fluorenyl ligands, dibenzo[b,h]fluorenyl ligands, benzo[b] fluorenyl ligands, azulenyl ligands, pentalenyl ligands, cyclopenta[b]naphthyl ligands, cyclopenta[a]naphthyl ligands, cyclopenta[b]thienyl ligands, cyclopenta[c]thienyl ligands, cyclopenta[b]pyrrolyl ligands, cyclopenta[c]pyrrolyl ligands, cyclopenta[b]furyl ligands, cyclopenta[c]furyl ligands, cyclopenta[b]phospholyl ligands, cyclopenta[c] phospholyl ligands, cyclopenta[b]pyridyl ligands, cyclopenta[c]pyridyl ligands, cyclopenta[c]phosphinyl ligands, cyclopenta[b]phosphinyl ligands, cyclopenta[g]quinolyl, cyclopenta[g]isoquinolyl, indeno [1,2-c]pyridyl, and the like, including hydrogenated versions thereof, for example tetrahydroindenyl ligands.

Non-limiting examples of LB include those listed for $L_A$ above. Additionally, $L_B$ is defined as J, wherein J is represented by the formula $J'\text{-}R''_{k\text{-}1\text{-}j}$ and J' is bonded to M. J' is a heteroatom with a coordination number of three from Group 15 or with a coordination number of two from Group 16 of the Periodic Table of Elements, and is preferably nitrogen; R" is selected from $C_1$-$C_{100}$ substituted or unsubstituted hydrocarbyl radical; k is the coordination number of the heteroatom J' where "k-1-j" indicates the number of R" substituents bonded to J'. Non-limiting examples of J include all isomers (including cyclics) of propylamido, butylamido, pentylamido, hexylamido, heptylamido, octylamido, nonylamido, decylamido, undecylamido, docecylamido, phenylamido, tolylamido, xylylamido, benzylamido, biphenylamido, oxo, sulfandiyl, hexylphosphido, and the like.

When present, T is a bridging group containing boron or a group 14, 15, or 16 element. Examples of suitable bridging groups include $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'_2CSiR'_2$, $R'_2SiSiR'5_2$, $R'_2CSiR'_2CR'_2$, $R'_2SiCR'_2SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'B$, $R'_2C-BR'$, $R'_2C-BR'-CR'_2$, $R'_2C-O-CR'_2$, $R'_2C-S-CR'_2$, $R'_2C-Se-CR'_2$, $R'_2C-NR'-CR'_2$, and $R'_2C-PR'-CR'_2$ where R' is hydrogen or a $C_1$-$C_{20}$ containing hydrocarbyl or substituted hydrocarbyl and optionally two or more adjacent R' may join to form a substituted or unsubstituted, saturated, partially unsaturated or aromatic, cyclic or polycyclic substituent.

Non-limiting examples of the bridging group T include $CH_2$, $CH_2CH_2$, $CMe_2$, $SiMe_2$, $SiEt_2$, $SiPh_2$, $SiMePh$, $Si(CH_2)_3$, $Si(CH_2)_4$, $Si(CH_2)_5$, $Si(Ph-p-SiEt_3)_2$, and the like. Non-limiting examples of D and E are independently, fluoro, chloro, bromo, iodo, methyl, ethyl, benzyl, dimethylamido, methoxy, and the like.

More preferred are metallocenes which are bis-cyclopentadienyl derivatives of a group 4 transition metal, preferably zirconium or hafnium. See WO 99/41294. These may advantageously be derivatives containing a fluorenyl ligand and a cyclopentadienyl ligand connected by a single carbon and silicon atom. See WO 99/45040 and WO 99/45041. Most preferably, the Cp ring is unsubstituted and/or the bridge contains alkyl substituents, suitably alkylsilyl substituents to assist in the alkane solubility of the metallocene. See WO 00/24792 and WO 00/24793. Other possible metallocenes include those in WO 01/58912. Other suitable metallocenes may be bis-fluorenyl derivatives or unbridged indenyl derivatives, which may be substituted at one or more positions on the fused ring with moieties which have the effect of increasing the molecular weight and so indirectly permit polymerization at higher temperatures, such as described in EP 693 506 and EP 780 395.

Catalyst compounds that are particularly useful in this invention include one or more of the metallocene compounds listed and described in Paragraphs [0089]-[0162] of US 2015-0025209, which was previously incorporated by reference herein. For instance, useful catalyst compounds may include any one or more of: cyclotetramethylenesilylene-bis(2,4,7-trimethylinden-1-yl)hafnium dimethyl, cyclopentamethylenesilylene-bis(2,4,7-trimethylinden-1-yl)hafnium dimethyl, cyclotrimethylenesilylene-bis(2,4,7-trimethylinden-1-yl)hafnium dimethyl, cyclotetramethylenesilylene-bis(2,4-dimethylinden-1-yl)hafnium dimethyl, cyclopentamethylenesilylene-bis(2,4-dimethylinden-1-yl)hafnium dimethyl, cyclotrimethylenesilylene-bis(2,4-dimethylinden-1-yl)hafnium dimethyl, cyclotetramethylenesilylene-bis(4,7-dimethylinden-1-yl)hafnium dimethyl, cyclopentamethylenesilylene-bis(4,7-dimethylinden-1-yl)hafnium dimethyl, cyclotrimethylenesilylene-bis(4,7-dimethylinden-1-yl)5 hafnium dimethyl, cyclotetramethylenesilylene-bis(2-methyl-4-cyclopropylinden-1-yl)hafnium dimethyl, cyclopentamethylenesilylene-bis(2-methyl-4-cyclopropylinden-1-yl)hafnium dimethyl, cyclotrimethylenesilylene-bis(2-methyl-4-cyclopropylinden-1-yl)hafnium dimethyl, cyclotetramethylenesilylene-bis(2-ethyl-4-cyclopropylinden-1-yl)hafnium dimethyl, cyclopentamethylenesilylene-bis(2-ethyl-4-cyclopropylinden-1-yl)hafnium dimethyl, cyclotrimethylenesilylene-bis(2-ethyl-4-cyclopropylinden-1-yl)hafnium dimethyl, cyclotetramethylenesilylene-bis(2-methyl-4-t-butylinden-1-yl)hafnium dimethyl, cyclopentamethylenesilylene-bis(2-methyl-4-t-butylinden-1-yl)hafnium dimethyl, cyclotrimethylenesilylene-bis(2-methyl-4-t-butylinden-1-yl)hafnium dimethyl, cyclotetramethylenesilylene-bis(4,7-diethylinden-1-yl)hafnium dimethyl, cyclopentamethylenesilylene-bis(4,7-diethylinden-1-yl)hafnium dimethyl, cyclotrimethylenesilylene-bis(4,7-diethylinden-1-yl)hafnium dimethyl, cyclotetramethylenesilylene-bis(2,4-diethylinden-1-yl)hafnium dimethyl, cyclopentamethylenesilylene-bis(2,4-diethylinden-1-yl)hafnium dimethyl, cyclotrimethylenesilylene-bis(2,4-diethylinden-1-yl)hafnium dimethyl, cyclotetramethylenesilylene-bis(2-methyl-4,7-diethylinden-1-yl)hafnium dimethyl, cyclopentamethylenesilylene-bis(2-methyl-4,7-diethylinden-1-yl)hafnium dimethyl, cyclotrimethylenesilylene-bis(2-methyl-4,7-diethylinden-1-yl)hafnium dimethyl, cyclotetramethylenesilylene-bis(2-ethyl-4-methylinden-1-yl) hafnium dimethyl, cyclopentamethylenesilylene-bis(2-ethyl-4-methylinden-1-yl)hafnium dimethyl, cyclotrimethylenesilylene-bis(2-ethyl-4-methylinden-1-yl) hafnium dimethyl, cyclotetramethylenesilylene-bis(2-methyl-4-isopropylinden-1-yl)hafnium dimethyl, cyclopentamethylenesilylene-bis(2-methyl-4-isopropylinden-1-yl) hafnium dimethyl, cyclotrimethylenesilylene-bis(2-methyl-4-isopropylinden-1-yl)hafnium dimethyl.

Likewise, the catalyst compounds described herein may be synthesized in any suitable manner, including in accordance with procedures described in Paragraphs [0096] and [00247]-[00247] of U.S. Ser. No. 14/325,449, filed Jul. 8, 2014 and published as US 2015-0025209.

Additional useful catalyst compounds may include any one or more of: rac-dimethylsilyl-bis(2-methyl-4-phenyl-indenyl)hafniumdimethyl; rac-dimethylsilyl-bis(2-methyl-4-phenyl-indenyl) hafniumdichloride; rac-dimethylsilyl-bis(2-methyl-4-phenyl-indenyl) zirconiumdimethyl; rac-dimethylsilyl-bis(2-methyl-4-phenyl-indenyl) zirconiumdichloride; rac-dimethylsilyl-bis(2-methyl-benzindenyl)5 hafniumdimethyl; rac-dimethylsilyl-bis(2-methyl-benzindenyl) hafniumdichloride; rac-dimethylsilyl-bis(2-methyl-benzindenyl) zirconiumdimethyl; rac-dimethylsilyl-bis(2-methyl-benzindenyl) zirconiumdichloride; rac-dimethylsilylbis [(2-methyl-4-phenyl)indenyl] zirconiumdimethyl; rac-dimethylsilylbis [(2-methyl)indenyl]zirconiumdimethyl; rac-dimethylsilyl-bis (indenyl)hafniumdimethyl; rac-dimethylsilyl-bis(indenyl) hafniumdichloride; rac-dimethylsilyl-bis(indenyl) zirconiumdimethyl; rac-dimethylsilyl-bis(indenyl) zirconiumdichloride; bis(1-methyl,4-butylcyclopentadienyl) zirconiumdichloride; bis(1-methyl,4-butylcyclopentadienyl) zirconiumdimethyl; bis(1-methyl,4-butylcyclopentadienyl) zirconiumdimethoxide; bis(1-methyl,4-butylcyclopentadienyl)zirconiumdibenzyl; bis(1-methyl,4-butylcyclopentadienyl)zirconiumdifluoride; bis(1-methyl,4-butylcyclopentadienyl)zirconiumdiamide; bis(1-methyl,4-ethylcyclopentadienyl)zirconiumdichloride; bis(1-methyl,4-ethylcyclopentadienyl)zirconiumdimethyl; bis(1-methyl,4-benzylcyclopentadienyl)zirconiumdichloride; bis(1-methyl,4-benzylcyclopentadienyl)zirconiumdimethyl; bis(1-methyl,3-butylcyclopentadienyl)zirconiumdichloride; bis(1- methyl,3-butylcyclopentadienyl)zirconiumdimethyl; bis(1-methyl,3-n-propylcyclopentadienyl)zirconiumdichloride; and/or bis(1-methyl,3-n-propylcyclopentadienyl)zirconiumdimethyl.

Suitable mono-Cp amido group 4 complexes useful herein include: dimethylsilylene(tetramethylcyclopentadienyl)(cyclododecylamido)titanium dimethyl; dimethylsilylene(tetramethylcyclopentadienyl)(tert-butylamido)titanium dimethyl; dimethylsilylene(tetramethylcyclopentadienyl)(adamantylamido)titanium dimethyl; dimethylsilylene(tetramethylcyclopentadienyl)(cyclooctylamido)titanium dimethyl; dimethylsilylene(tetramethylcyclopentadienyl)(cyclohexylamido)titanium dimethyl; dimethylsilylene(tetramethylcyclopentadienyl)(norbornylamido)titanium dimethyl; dimethylsilylene(trimethylcyclopentadienyl)(cyclododecylamido)titanium dimethyl; dimethylsilylene(trimethylcyclopentadienyl)(adamantylamido)titanium dimethyl; dimethylsilylene(trimethylcyclopentadienyl)(tert-butylamido)titanium dimethyl; dimethylsilylene(6-methyl-1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1,2,3,5-tetrahydro-sindacen-5-yl)(cyclooctylamido)titanium dimethyl; dimethylsilylene(6-methyl-1,2,3,5-tetrahydro-s-indacen-5-yl)(cyclohexylamido)titanium dimethyl; dimethylsilylene(6-methyl-1,2,3,5-tetrahydro-s-indacen-5-yl)(cyclododecylamido)titanium dimethyl;dimethylsilylene(2,2,6-trimethyl-1,2,3,5-tetrahydro-s-indacen-5-yl)(adamantylamido)titanium dimethyl; dimethylsilylene(2,2,6-trimethyl-1,2,3,5-tetrahydros-indacen-5-yl)(cyclohexylamido)titanium dimethyl; dimethylsilylene(2,2,6-trimethyl-1,2,3,5-tetrahydro-s-indacen-5-yl)(cyclododecylamido)titanium dimethyl; dimethylsilylene(2,2,6-trimethyl-1,2,3,5-tetrahydro-s-indacen-5-yl)(tert-butylamido)titanium dimethyl, and any combination thereof.

Particularly useful fluorenyl-cyclopentadienyl group 4 complexes include: 1,1'-bis(4-triethylsilylphenyl)methylene-(cyclopentadienyl)(2,7-di-tert-butyl-fluoren-9-yl)hafnium dimethyl; dimethylsilylene(cyclopentadienyl)(2,7-di-tert-butyl-fluoren-9-yl)hafnium dimethyl; dimethylsilylene(cyclopentadienyl)(3,6-di-tert-butyl-fluoren-9-yl)hafnium dimethyl; diphenylmethylene(cyclopentadienyl)(2,7-di-tert-butyl-fluoren-9-yl)hafnium dimethyl; diphenylmethylene(cyclopentadienyl)(3,6-di-tert-butyl-fluoren-9-yl)hafnium dimethyl; isopropylidene(cyclopentadienyl)(2,7-di-tert-butyl-fluoren-9-yl)hafnium dimethyl; isopropylidene(cyclopentadienyl)(3,6-di-tert-butyl-fluoren-9-yl)hafnium dimethyl; dimethylsilylene(cyclopentadienyl)(2,7-dimethylfluoren-9-yl)hafnium dimethyl; dimethylsilylene(cyclopentadienyl)(3,6-dimethylfluoren-9-yl)hafnium dimethyl; diphenylmethylene(cyclopentadienyl)(2,7-dimethylfluoren-9-yl)hafnium dimethyl; diphenylmethylene(cyclopentadienyl)(3,6-dimethylfluoren-9-yl)hafnium dimethyl; dimethylsilylene(cyclopentadienyl)(fluoren-9-yl)hafnium dimethyl; isopropylidene(cyclopentadienyl)(fluoren-9-yl)hafnium dimethyl; diphenylmethylene(cyclopentadienyl)(fluoren-9-yl)hafnium dimethyl; and 1,1'-bis(4-triethylsilylphenyl)methylene(cyclopentadienyl)(2,7-di-tert-butyl-fluoren-9-yl)hafnium dimethyl.

2. Ziegler-Natta Catalyst

Suitable catalysts for use in the processes and systems disclosed herein include Ziegler-Natta catalysts comprising: 1) a solid titanium catalyst component comprising a titanium compound, a magnesium compound, and an internal electron donor; 2) a co-catalyst such as an organoaluminum compound; and 3) external electron donor(s). Ziegler-Natta catalysts, catalyst systems, and preparations thereof include supported catalyst systems described in U.S. Pat. Nos. 4,990,479; 5,159,021; and WO 00/44795, preferably including solid titanium and or magnesium. For example, useful Ziegler-Natta catalysts are typically composed of a transition metal compound from groups 4, 5, 6, and/or 7 (preferably group 4) and an organometallic compound of a metal from groups 11, 12, and/or 13 (preferably group 13) of the periodic table. Well-known examples include $TiCl_3$-$Et_2AlCl$, $AlR_3$-$TiCl_4$, wherein Et is an ethyl group and R represents an alkyl group, typically a $C_1$-$C_{20}$ alkyl group, such as methyl, ethyl, propyl, butyl, pentyl, hexyl, octyl, and the like. These catalysts include mixtures of halides of transition metals, especially titanium, chromium, vanadium, and zirconium, with organic derivatives of nontransition metals, particularly alkyl aluminum compounds.

Briefly, the Ziegler-Natta catalysts can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesium hydrocarbon composition of step (2) with additional titanium halide.

The Ziegler-Natta catalyst is typically combined with a co-catalyst which is preferably an organoaluminum compound that is halogen free. Suitable halogen free organoaluminum compounds are, in particular, branched unsubstituted alkylaluminum compounds of the formula $AlR_3$, where R denotes an alkyl radical having 1 to 20 carbon atoms (preferably methyl, ethyl, propyl, butyl, pentyl, hexyl, octyl, and the like), such as, for example, trimethylaluminum, triethylaluminum, triisobutylaluminum, and tridiisobutylaluminum. Additional compounds that are suitable for use as a cocatalyst are readily available and amply disclosed in the prior art including U.S. Pat. No. 4,990,477, which is incorporated herein by reference. The same or different Ziegler-Natta catalyst(s) can be used in both the initial and subsequent polymerization steps. Preferably, the solid catalyst is a magnesium supported $TiCl_4$ catalyst and the organoaluminum co-catalyst is triethylaluminum.

Electron donors are also typically used in two ways in the formation of Ziegler-Natta catalysts and catalyst systems. An internal electron donor may be used in the formation reaction of the catalyst as the transition metal halide is reacted with the metal hydride or metal alkyl. Examples of internal electron donors include amines, amides, ethers, esters, aromatic esters, ketones, nitriles, phosphines, stilbenes, arsines, phosphoramides, thioethers, thioesters, aldehydes, alcoholates, and salts of organic acids. In conjunction with an internal donor, an external electron donor may also be used in combination with a catalyst. External electron donors often affect the level of stereoregularity in polymerization reactions. The second use for an electron donor in a catalyst system is as an external electron donor and stereoregulator in the polymerization reaction. The same compound may be used in both instances, although typically they are different. Preferred external electron donor materials may include organic silicon compounds, e.g., tetraethoxysilane (TEOS) and dicyclopentydimethoxysilane (DCPMS). Internal and external-type electron donors are described, for example, in U.S. Pat. No. 4,535,068, which is incorporated herein by reference. The use of organic silicon compounds as external electron donors are described, for example, in U.S. Pat. Nos. 4,218,339; 4,395,360; 4,328,122; 4,473,660; 6,133,385; and 6,127,303, all of which are incorporated herein by reference. Particularly useful electron donors include external electron donors used as stereoregulators, in combination with Ziegler-Natta catalysts.

A particularly useful Ziegler-Natta catalyst is a magnesium chloride supported titanium catalyst selected from the group of THC-C type catalyst solid systems available from Toho Titanium Corporation of Japan. Particularly preferred donor systems include those described in U.S. Pat. No. 6,087,459, such as for example, a blend of propyltriethoxysilane (PTES) and dicyclopentyldimethoxysilane (DCPMS), typically a 95/5 mol % blend. Another useful donor is methylcyclohexyl di-methoxysilane (MCMS).

A particular Ziegler-Natta catalyst may produce better results when paired with a particular group of electron donors. Examples of this paring of catalyst and electron donors are disclosed in U.S. Pat. Nos. 4,562,173 and 4,547,552, which are incorporated by reference herein.

3. Pyridyldiamido Compound

Another suitable catalyst for use in the processes and systems disclosed herein include pyridyldiamido compounds. The term "pyridyldiamido compound", "pyridyldiamido complex" or "pyridyldiamide complex" or "pyridyldiamido catalyst" or pyridyldiamide catalyst" refers to a class of coordination complexes described in U.S. Pat. No. 7,973,116; US 2012/0071616; US 2011/0224391; US 2011/0301310; US 2014/0221587; US 2014/0256893; US 2014/0316089; US 2015/0141590; and US 2015/0141601 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes, the pyridyldiamido ligand is coordinated to the metal with the formation of one five-membered chelate ring and one seven-membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

In one aspect, the catalyst system comprises a pyridyldiamido transition metal complex represented by Formula (A):

(A)

wherein:
M* is a Group 4 metal (preferably hafnium);
each E' group is independently selected from carbon, silicon, or germanium (preferably carbon);
each X' is an anionic leaving group (preferably alkyl, aryl, hydride, alkylsilane, fluoride, chloride, bromide, iodide, triflate, carboxylate, alkylsulfonate);
L* is a neutral Lewis base (preferably ether, amine, thioether);

$R'^1$ and $R'^{13}$ are independently selected from the group consisting of hydrocarbyls, substituted hydrocarbyls, and silyl groups (preferably aryl);
$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2;
two X' groups may be joined together to form a dianionic group;
two L* groups may be joined together to form a bidentate Lewis base;
an X' group may be joined to an L* group to form a monoanionic bidentate group;
$R'^7$ and $R'^8$ may be joined to form a ring (preferably an aromatic ring, a six-membered aromatic ring with the joined $R'^7R'^8$ group being —CH═CHCH═CH—); and
$R'^{10}$ and $R'^{11}$ may be joined to form a ring (preferably a five-membered ring with the joined $R'^{10}R'^{11}$ group being —CH$_2$CH$_2$— or a six-membered ring with the joined $R'^{10}R'^{11}$ group being —CH$_2$CH$_2$CH$_2$—).

In any embodiment described herein, M* is preferably Zr, or Hf, preferably Hf. In any embodiment described herein, the R' groups above ($R'^1$, $R'^2$, $R'^3$, $R'^4$, $R'^5$, $R'^6$, $R'^7$, $R'^8$, $R'^9$, $R'^{10}$, $R'^{11}$ $R'^{12}$, and $R'^{13}$) preferably contain up to 30, preferably no more than 30 carbon atoms, especially from 2 to 20 carbon atoms. Preferably, $R'^1$ is selected from phenyl groups that are variously substituted with between zero to five substituents that include F, Cl, Br, I, CF$_3$, NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In any embodiment described herein, preferably $R'^1$ and $R'^{13}$ are independently selected from phenyl groups that are variously substituted with between zero to five substituents that include F, Cl, Br, I, CF$_3$, NO$_2$, alkoxy, dialkylamino, aryl, and alkyl groups with between one to ten carbons, such as methyl, ethyl, propyl, butyl, pentyl, hexyl, heptyl, octyl, nonyl, decyl, and isomers thereof. In any embodiment described herein, preferably E is carbon, and $R'^1$ and $R'^{13}$ are independently selected from phenyl groups that are variously substituted with between zero to five substituents that include F, Cl, Br, I, CF$_3$, NO$_2$, alkoxy, dialkylamino, hydrocarbyl, and substituted hydrocarbyls, groups with from one to ten carbons. In any embodiment described herein, preferably $R'^1$ and $R'^{13}$ are selected from aryl or alkyl groups containing from 6 to 30 carbon atoms, especially phenyl groups. It is preferred that $R^1$ and $R'^{13}$ be chosen from aryl or alkyl groups and that $R'^2$, $R'^3$, $R'^{11}$, and $R'^{12}$, be independently chosen from hydrogen, alkyl, and aryl groups, such as phenyl. The phenyl groups may be alkyl substituted. The alkyl substituents may be straight chain alkyls, but include branched alkyls. Preferably, each $R'^1$ and $R'^{13}$ is a substituted phenyl group with either one or both of $R'^2$ and $R'^{11}$ being substituted with a group containing between one to ten carbons. Some specific examples would include, $R^1$ and $R^{13}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

Preferably, $R^7$ and $R^8$ may be joined to form a four- to ten-membered ring. One example has the $R'^7R'^8$ group being —CH═CHCH═CH—, with the formation of an aromatic six-membered ring. Preferably, $R'^{10}$ and $R'^{11}$ may be joined to form a four- to ten-membered ring. One specific example has the $R'^{10}R'^{11}$ group being —CH$_2$CH$_2$—, with the formation of a five-membered ring. Another example has the R'$^{10}$R'$^{11}$ being —CH$_2$CH$_2$CH$_2$—, with the formation of a six-membered ring.

Preferably, E' is carbon. Preferably, R'$^{12}$ is an aromatic hydrocarbyl group containing between 6 to 12 carbon atoms and R'$^{13}$ is a saturated hydrocarbon containing between 3 to 12 carbon atoms. A specific example has R'$^{12}$=2-isopropylphenyl and R'$^{13}$=cyclohexyl.

In any embodiment described herein, R'$^2$, R'$^3$, R'$^4$, R'$^5$, R'$^6$, R'$^7$, R'$^8$, R'$^9$, R'$^{10}$, R'$^{11}$, and R'$^{12}$ may be hydrogen or alkyl from 1 to 4 carbon atoms. Preferably 0, 1, or 2 of R'$^2$, R'$^3$, R'$^4$, R'$^5$, R'$^6$, R'$^7$, R'$^8$, R'$^9$, R'$^{10}$, R'$^{11}$, and R'$^{12}$ are alkyl substituents.

In any embodiment described herein, preferably X' is selected from alkyl, aryl, hydride, alkylsilane, fluoride, chloride, bromide, iodide, triflate, carboxylate, alkylsulfonate, alkoxy, amido, hydrido, phenoxy, hydroxy, silyl, allyl, alkenyl, and alkynyl. In any embodiment described herein, preferably L* is selected from ethers, thio-ethers, amines, nitriles, imines, pyridines, and phosphines, preferably ethers.

Catalyst systems may comprise a pyridyldiamido transition metal complex represented by Formula (I):

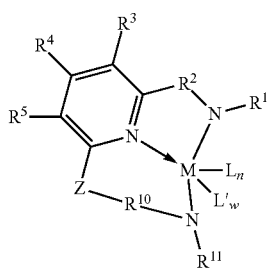

(I)

M is a Group 4 metal, preferably a Group 4 metal, more preferably Ti, Zr, or Hf;
Z is —(R$^{14}$)$_p$C—C(R$^{15}$)$_q$—, where R$^{14}$ and R$^{15}$ are independently selected from the group consisting of hydrogen, hydrocarbyls, and substituted hydrocarbyls, (preferably hydrogen and alkyls), and wherein adjacent R$^{14}$ and R$^{15}$ groups may be joined to form an aromatic or saturated, substituted or unsubstituted hydrocarbyl ring, where the ring has 5, 6, 7, or 8 ring carbon atoms and where substitutions on the ring can join to form additional rings; p is 1 or 2, and q is 1 or 2; R$^1$ and R$^{11}$ are independently selected from the group consisting of hydrocarbyls, substituted hydrocarbyls, and silyl groups (preferably alkyl, aryl, heteroaryl, and silyl groups); R$^2$ and R$^{10}$ are each, independently, —E(R$^{12}$)(R$^{13}$)— with E being carbon, silicon, or germanium, and each R$^{12}$ and R$^{13}$ being independently selected from the group consisting of hydrogen, hydrocarbyl, and substituted hydrocarbyl, alkoxy, silyl, amino, aryloxy, halogen, and phosphino (preferably hydrogen, alkyl, aryl, alkoxy, silyl, amino, aryloxy, heteroaryl, halogen, and phosphino), R$^{12}$ and R$^{13}$ may be joined to each other or to R$^{14}$ or R$^{15}$ to form a saturated, substituted or unsubstituted hydrocarbyl ring, where the ring has 4, 5, 6, or 7 ring carbon atoms and where substitutions on the ring can join to form additional rings, or R$^{12}$ and R$^{13}$ may be joined to form a saturated heterocyclic ring, or a saturated substituted heterocyclic ring where substitutions on the ring can join to form additional rings;

R$^3$, R$^4$, and R$^5$ are independently selected from the group consisting of hydrogen, hydrocarbyls, substituted hydrocarbyls, alkoxy, aryloxy, halogen, amino, and silyl, (preferably hydrogen, alkyl, alkoxy, aryloxy, halogen, amino, silyl, and aryl), and wherein adjacent R groups (R$^3$ & R$^4$ and/or R$^4$ & R$^5$) may be joined to form a substituted or unsubstituted hydrocarbyl or heterocyclic ring, where the ring has 5, 6, 7, or 8 ring atoms and where substitutions on the ring can join to form additional rings;
L is an anionic leaving group, where the L groups may be the same or different and any two L groups may be linked to form a dianionic leaving group;
n is 1 or 2; L' is a neutral Lewis base; and w is 0, 1, or 2.

Often, Z is defined as an aryl so that the complex is represented by Formula (II):

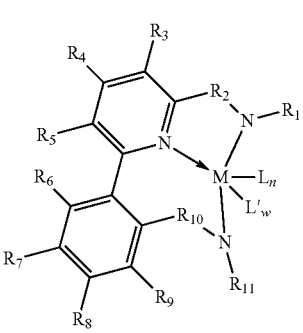

(II)

wherein:
R$^6$, R$^7$, R$^8$, and R$^9$ are independently selected from the group consisting of hydrogen, hydrocarbyls, substituted hydrocarbyls, alkoxy, halogen, amino, and silyl, and the pairs of positions, and wherein adjacent R groups (R$^6$ & R$^7$, and/or R$^7$ & R$^8$, and/or R$^8$ & R$^9$, and/or R$^9$ & R$^{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, R$^1$, R$^2$, R$^3$, R$^4$, R$^5$, R$^6$, R$^{10}$, and R$^{11}$ are as defined above.

Certain useful pyridyldiamido complexes are represented by Formula (III):

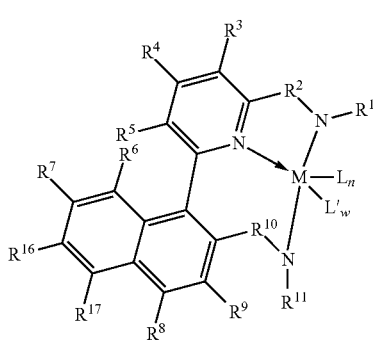

(III)

wherein R$^{16}$ and R$^{17}$ are independently selected from the group consisting of hydrogen, hydrocarbyls, substituted hydrocarbyls, alkoxy, halogen, amino, and silyl, and wherein adjacent R groups (R$^6$ & R$^7$ and/or R$^7$ & R$^{16}$ and/or R$^{16}$ & R$^{17}$, and/or R$^8$ & R$^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^6$, $R^7$, $R^8$, $R^9$, $R^{10}$, and $R^{11}$ are defined as above.

In any embodiment of Formula I, II, or III described herein, M is preferably Ti, Zr, or Hf, preferably HF or Zr. In any embodiment of Formula I, II, or III described herein, the R groups above ($R^1$, and $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$) preferably contain up to 30 carbon atoms, preferably no more than 30 carbon atoms, especially from 2 to 20 carbon atoms. In any embodiment of Formula I, II, or III described herein, preferably $R^1$, $R^2$ $R^3$, $R^4$, $R^5$, $R^6$, $R^7$, $R^8$, $R^9$, $R^{10}$, $R^{11}$, $R^{12}$, to $R^{13}$ contain up to 30 carbon atoms, especially from 2 to 20 carbon atoms.

Preferably, $R^1$ is selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof. In any embodiment of Formula I, II, or III described herein, preferably $R^1$ and $R^{11}$ are independently selected from phenyl groups that are variously substituted with between zero to five substituents that include F, Cl, Br, I, $CF_3$, $NO_2$, alkoxy, dialkylamino, aryl, and alkyl groups with between one to ten carbons, such as methyl, ethyl, propyl, butyl, pentyl, hexyl, heptyl, octyl, nonyl, decyl, and isomers thereof.

In any embodiment of Formula I, II, or III described herein, preferably E is carbon, and $R^1$ and $R^{11}$ are independently selected from phenyl groups that are variously substituted with between zero to five substituents that include: F, Cl, Br, I, $CF_3$, $NO_2$, alkoxy, dialkylamino, hydrocarbyl, and substituted hydrocarbyls, substituted with groups having from one to ten carbons. In any embodiment of Formula I, II, or III described herein, preferably $R^1$ and $R^{11}$ are selected from aryl or alkyl groups containing from 6 to 30 carbon atoms, especially phenyl groups. It is preferred that $R^1$ and $R^{11}$ be chosen from aryl or alkyl groups and that $R^{12}$, $R^{13}$, $R^{14}$, and $R^{15}$, be independently chosen from hydrogen, alkyl, and aryl groups, such as phenyl. The phenyl groups may be alkyl substituted. The alkyl substituents may be straight chain alkyls, but include branched alkyls.

Preferably, each $R^1$ and $R^{11}$ is a substituted phenyl group with either one or both of the carbons adjacent to the carbon joined to the amido nitrogen being substituted with a group containing between one to ten carbons. Some specific examples would include $R^1$ and $R^{11}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

In any embodiment of Formula I, II, or Ill described herein, $R^2$ is preferably selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Useful $R^2$ groups include $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl).

In any embodiment of Formula I, II, or III described herein, $R^{10}$ is preferably selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Useful $R'^{10}$ groups include $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl).

In any embodiment of Formula I, II, or III described herein, $R^{10}$ and $R^2$ are selected from $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl). In any embodiment of Formula I, II, or III described herein, $R^3$, $R^4$, $R^5$, $R^6$, $R^7$, $R^8$, and $R^9$ may be hydrogen or alkyl from 1 to 4 carbon atoms. Preferably 0, 1, or 2 of $R^3$, $R^4$, $R^5$, $R^6$, $R^7$, $R^8$, and $R^9$ are alkyl substituents. In any embodiment of Formula I, II, or III described herein, $R^3$, $R^4$, $R^5$, $R^6$, $R^7$, $R^8$, $R^9$, $R^{12}$, $R^{13}$, $R^{14}$, and $R^{15}$ are, independently, hydrogen, a $C_1$ to $C_{20}$ alkyl, preferably methyl, ethyl, propyl, butyl, pentyl, hexyl, heptyl, octyl, nonyl, decyl, undecyl, dodecyl, or an isomer thereof), or a $C_5$ to $C_{40}$ aryl group (preferably a $C_6$ to $C_{20}$ aryl group, preferably phenyl or substituted phenyl or an isomer thereof, preferably phenyl, 2-isopropylphenyl, or 2-tertbutylphenyl).

In any embodiment of Formula I, II, or III described herein, preferably L is selected from halide, alkyl, aryl, alkoxy, amido, hydrido, phenoxy, hydroxy, silyl, allyl, alkenyl, and alkynyl. In any embodiment of Formula I, II, or III described herein, preferably L' is selected from ethers, thio-ethers, amines, nitriles, imines, pyridines, and phosphines, preferably ethers.

The pyridyldiamido-metal complex is coordinated at the metal center as a tridentate ligand through two amido donors and one pyridyl donor. The metal center, M or M*, is a transition metal from Group 4. While in its use as a catalyst, according to current theory, the metal center is preferably in its four valent state, it is possible to create compounds in which M has a reduced valency state and regains its formal valency state upon preparation of the catalyst system by contacting with an activator (e.g., the organoaluminum treated layered silicate). Preferably, in addition to the pyridyldiamido ligand, the metal M or M* is also coordinated to n number of anionic ligands, with n being from 1 or 2. The anionic donors are typically halide or alkyl, but a wide range of other anionic groups are possible, including some that are covalently linked together to form molecules that could be considered dianionic, such as oxalate. For certain complexes, it is likely that up to three neutral Lewis bases (L or L*), typically ethers, could also be coordinated to the metal center. Preferably, w is 0, 1, or 2.

Preferably, L or L* may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred L or L* group is alkyl when using non-coordinating anions such as N,N-dimethylanilinium tetrakis(pentafluorophenyl)-borate or tris(pentafluorophenyl)borane. Often, two L or two L* groups may be linked to form a dianionic leaving group, for example oxalate. Often, each L* is independently selected from the group consisting of ethers, thio-ethers, amines, nitriles, imines, pyridines, phosphines, and preferably ethers.

Preferably, X may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred X is alkyl when using non-coordinating anions such as N,N-dimethylanilinium tetrakis(pentafluorophenyl)- borate or tris(pentafluorophenyl)borane. Often, two X groups may be linked to form a dianionic leaving group, for example, oxalate.

Preferred compounds useful as catalysts herein include the pyridyldiamide complexes A through D shown below:

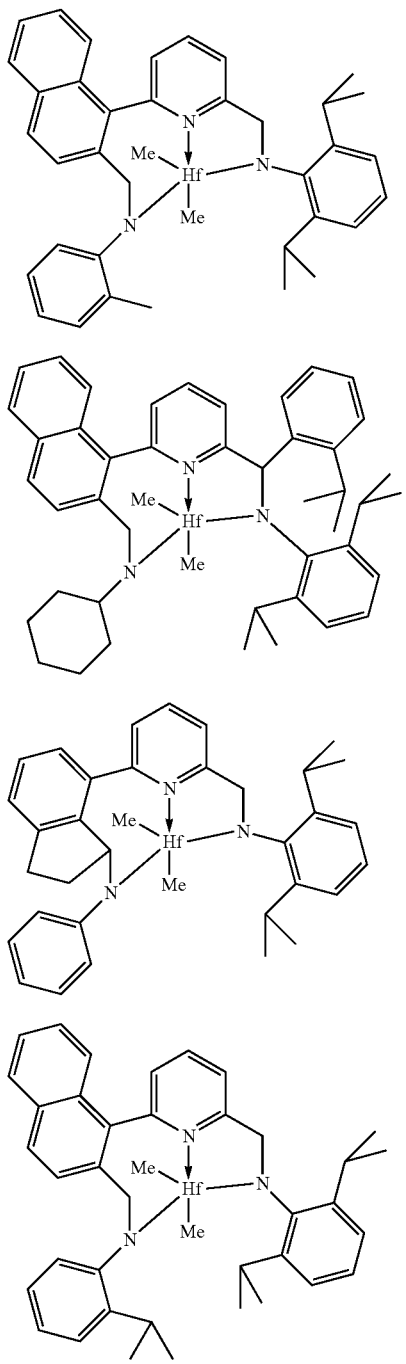

A

B

C

D

3(a). Complex Synthesis

A typical synthesis of the pyridyldiamido complexes is reaction of the neutral pyridyldiamine ligand with a metal-loamide, such as Hf(NMe$_2$)$_2$Cl$_2$(1,2-dimethoxyethane), Zr(NMe$_2$)$_4$, Zr(NEt$_2$)$_4$, Hf(NMe$_2$)$_4$, and Hf(NEt$_2$)$_4$. Another synthesis route for the pyridyldiamido complexes is the reaction of the neutral pyridyldiamine ligand precursors with an organolithium reagent to form the dilithio pyridyldiamido derivative followed by reaction of this species with either a transition metal salt, including ZrCl$_4$, HfCl$_4$, ZrCl$_4$(1,2-dimethoxyethane), HfCl$_4$(1,2-dimethoxyethane), ZrCl$_4$(tetrahydrofuran)$_2$, HfCl$_4$(tetrahydrofuran)$_2$, ZrBn$_2$Cl$_2$(OEt$_2$), and HfBn$_2$Cl$_2$(OEt$_2$). Another preferred synthesis route for the pyridyldiamido complexes is reaction of the neutral pyridyldiamine ligands with an organometallic reactant, such as ZrBn$_4$, ZrBn$_2$Cl$_2$(OEt$_2$), Zr(CH$_2$SiMe$_3$)$_4$, Zr(CH$_2$CMe$_3$)$_4$, HfBn$_4$, HfBn$_2$Cl$_2$(OEt$_2$), Hf(CH$_2$SiMe$_3$)$_4$, and Hf(CH$_2$CMe$_3$)$_4$. The general synthetic routes used for the complexes presented herein are described in US 2014/0221587 and US 2015/0141601.

Useful bulky ligand metallocene catalyst compounds include those described in WO 99/01481 and WO 98/42664, which are fully incorporated herein by reference. Useful Group 6 bulky ligand metallocene catalyst systems are described in U.S. Pat. No. 5,942,462, which is incorporated herein by reference.

Still other useful catalysts include those multinuclear metallocene catalysts as described in WO 99/20665 and U.S. Pat. No. 6,010,794, and transition metal metaaracyle structures described in EP 0 969 101 A2, which are incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in any embodiment the bulky ligand metallocene catalysts, described above, may include their structural or optical or enantiomeric isomers (meso and racemic isomers, for example, see U.S. Pat. No. 5,852,143, incorporated herein by reference) and mixtures thereof. It is further contemplated that any one of the bulky ligand metallocene catalyst compounds, described above, have at least one fluoride or fluorine containing leaving group as described in U.S. Pat. No. 6,632,901.

The Group 15 containing metal compounds utilized in the catalyst composition can be prepared by methods known in the art, such as those disclosed in EP 0 893 454 A1; U.S. Pat. No. 5,889,128; and the references cited in U.S. Pat. No. 5,889,128; which are all incorporated herein by reference. U.S. Pat. No. 6,271,325 discloses a gas or slurry phase polymerization process using a supported bisamide catalyst, which is also incorporated herein by reference. For additional information of Group 15 containing metal compounds, please see Mitsui Chemicals, Inc. in EP 0 893 454 A1, which discloses transition metal amides combined with activators to polymerize olefins.

Often, the Group 15 containing metal compound is allowed to age prior to use as a polymerization. It has been noted on at least one occasion that one such catalyst compound (aged at least 48 hours) performed better than a newly prepared catalyst compound.

It is further contemplated that bis-amide based pre-catalysts may be used. Exemplary compounds include those described in the patent literature. International patent publications WO 96/23010; WO 97/48735; and Gibson et al. (1998) *Chem. Comm.*, pp. 849-50, which disclose diimine-based ligands for Group 8-10 compounds that undergo ionic activation and polymerize olefins. Polymerization catalyst systems from Group 5-10 metals, in which the active center is highly oxidized and stabilized by low-coordination-number, polyanionic, ligand systems, are described in U.S. Pat. No. 5,502,124 and its divisional U.S. Pat. No. 5,504,049. See also the Group 5 organometallic catalyst compounds of U.S. Pat. No. 5,851,945 and the tridentate-ligand-containing, Group 5-10, organometallic catalysts of U.S. Pat. No. 6,294,495. Group 11 catalyst precursor compounds, activatable with ionizing cocatalysts, useful for olefin and vinylic polar molecules are described in WO 99/30822.

Other useful catalyst compounds are those Group 5 and 6 metal imido complexes described in EP A2 0 816 384 and U.S. Pat. No. 5,851,945, which are incorporated herein by reference. In addition, metallocene catalysts include bridged bis(arylamido) Group 4 compounds described by McConville et al., (1995), *Organometallics,* 14, pp. 5478-80, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is incorporated herein by reference.

U.S. Pat. No. 5,318,935 describes bridged and unbridged, bisamido catalyst compounds of Group 4 metals capable of α-olefins polymerization. Bridged bi(arylamido) Group 4 compounds for olefin polymerization are described by McConville et al. (1995) *Organometallics,* 14, pp. 5478-80. This reference presents synthetic methods and compound characterizations. Further work appearing in McConville et al. (1996), *Macromolecules,* 29, pp. 5241-43, describes bridged bis(arylamido) Group-4 compounds that are polymerization catalysts for 1-hexene. Additional suitable transition metal compounds include those described in WO 96/40805. Cationic Group 3 or Lanthanide-metal olefin polymerization complexes are disclosed in U.S. Ser. No. 09/408,050. A monoanionic bidentate ligand and two monoanionic ligands stabilize those catalyst precursors, which can be activated with ionic cocatalysts.

The literature describes many additional suitable catalyst precursor compounds. Compounds that contain abstractable ligands or that can be alkylated to contain abstractable ligands. See, for instance, V.C. Gibson et al; "The Search for New-Generation Olefin Polymerization Catalysts: Life Beyond Metallocenes," *Angew. Chem. Int. Ed.,* 38, pp. 428-447, (1999).

Useful catalysts may contain phenoxide ligands such as those disclosed in EP 0 874 005 A1, which is incorporated herein by reference. Certain useful catalysts are disclosed in U.S. Pat. No. 7,812,104; WO 2008/079565; WO 2008/109212; U.S. Pat. No. 7,354,979; U.S. Pat. No. 7,279,536; U.S. Pat. No. 7,812,104; and U.S. Pat. No. 8,058,371; which are incorporated herein by reference.

Particularly useful metallocene catalyst and non-metallocene catalyst compounds are those disclosed in paragraphs [0081] to [0111] of U.S. Ser. No. 10/667,585 (U.S. Pat. No. 7,354,979) and paragraphs [0173] to [0293] of U.S. Ser. No. 11/177,004 (US 2006/0025545), the paragraphs of which are fully incorporated herein by reference. Metallocene catalyst compounds useful herein may also be represented by the formula:

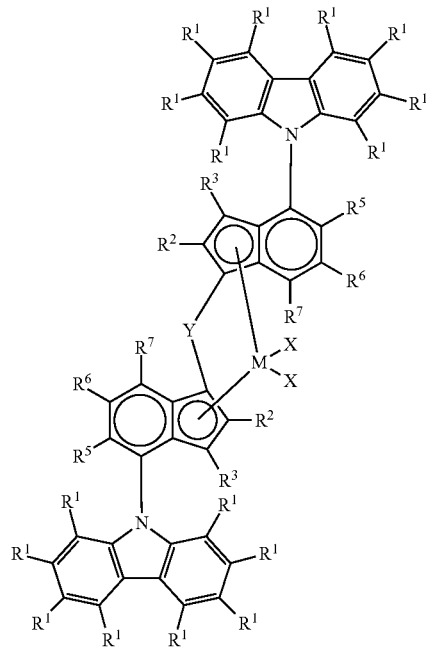

wherein M is a transition metal selected from Group 4 of the Periodic Table of the Elements (preferably Hf or Zr, preferably Zr);

each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group (preferably Y is A* as described above); and each X is, independently, as defined for Q* above, preferably, each X is a halogen or hydrocarbyl, such as methyl. For more information on such catalyst compounds, please see U.S. Pat. No. 7,812,104, which is incorporated herein by reference.

Additional useful catalyst compounds are also described in U.S. Pat. No. 6,506,857, which is incorporated herein by reference.

Useful catalyst compounds include one, two, three, or more of: dimethylsilyl-bis [2-methyl-4-(carbazol-9-yl)inden-1-yl]zirconiumdimethyl; dimethylsilyl-bis[2-methyl-4-(carbazol-9-yl)inden-1-yl]zirconium dichloride; μ-dimethyl silylbis(2-methyl, 4-phenylindenyl) zirconium (or hafnium) dichloride; μ-dimethyl silylbis(2-methyl, 4-phenylindenyl) zirconium (or hafnium) dimethyl; μ-dimethyl silylbis(2-methyl, 4-(3',5'-di-t-butylphenyl)indenyl) zirconium (or hafnium) dimethyl; μ-dimethyl silylbis(2-methyl, 4-(3',5'-di-t-butylphenyl)indenyl) zirconium (or hafnium) dichloride; 1,1'-bis(4-triethylsilylphenyl)methylene-(cyclopentadienyl) (2,7-di-tertiary-butyl-9-fluorenyl)hafnium dichloride; 1,1'-bis(4-triethylsilylphenyl)methylene-(cyclopentadienyl)(2,7-di-tertiary-butyl-9-fluorenyl)hafnium dimethyl; dimethylsilyl(tetramethylcyclopentadienyl)(cyclododecylamido)titanium dimethyl; dimethylsilyl(tetramethylcyclopentadienyl)(cyclododecylamido)titanium dichloride; 1,1'-bis(4-triethylsilylphenyl)methylene-(cyclopentadienyl)(2,7-di-tertiary-butyl-9-fluorenyl)hafnium dichloride; 1,1'-bis(4-triethylsilylphenyl)methylene-(cyclopentadienyl)(2,7-di-tertiary-butyl-9-fluorenyl)hafnium dimethyl; dimethylsilylbis(indenyl)hafnium dichloride; dimethylsilylbis(indenyl)hafnium dimethyl; dimethylsilyl bis(2-methyl-indenyl) zirconium dichloride; dimethylsilyl bis(2-methyl-indenyl) zirconium dimethyl; dimethylsilyl bis(2-methylfluorenyl) zirconium dichloride; dimethylsilyl bis(2-methylfluorenyl) zirconium dimethyl; dimethylsilyl bis(2-methyl-5,7-propylindenyl) zirconium dichloride; dimethylsilyl bis(2-methyl-5,7-propylindenyl) zirconium dimethyl; dimethylsilyl bis(2-methyl-5-phenylindenyl) zirconium dichloride; dimethylsilyl bis(2-methyl-5-phenylindenyl) zirconium dimethyl; dimethylsilyl bis(2-ethyl-5-phenylindenyl) zirconium dichloride; dimethylsilyl bis(2-ethyl-5-phenylindenyl) zirconium dimethyl; dimethylsilyl bis(2-methyl-5-biphenylindenyl) zirconium dichloride; and dimethylsilyl bis(2-methyl-5-biphenylindenyl) zirconium dimethyl.

Often, the coordination catalyst is 1,1'-bis(4-triethylsilyl-phenyl)methylene-(cyclopentadienyl)(3,8-di-tertiary-butyl-1-fluorenyl) hafnium chloride, or 1,1'-bis(4-triethylsilylphenyl)methylene-(cyclopentadienyl)(3,8-di-tertiary-butyl-1-fluorenyl) hafnium dimethyl (numbering assumes the bridge is in the 1 position).

Often, two or more different catalyst compounds are present in the catalyst system used herein. Often, two or more different catalyst compounds are present in the reaction zone where the process(es) described herein occur. When two transition metal compound-based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand, which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. Often, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

4. Activators

The terms "co-catalyst" and "activator" are used herein interchangeably and are defined to be any compound which can activate any one of the catalyst precursor compounds described herein by converting the neutral catalyst precursor compound to a catalytically active catalyst compound. Non-limiting activators, for example, include alumoxanes, aluminum alkyls, ionizing activators (also referred to as non-coordinating anion activators), which may be neutral or ionic, and conventional-type co-catalysts. Preferred activators typically include, alumoxane compounds, modified alumoxane compounds, and ionizing anion precursor compounds that abstract a reactive, 6-bound ligand (for example, chloride or alkyl, most often methyl) making the metal complex cationic and providing a charge-balancing non-coordinating or weakly coordinating anion.

After the compounds described above have been synthesized, catalyst compounds (e.g., metallocene compounds) may be activated by combining them with activators in any manner known from the literature including by supporting them for use in slurry or gas phase polymerization. Non-limiting activators, for example, include alumoxanes, non-coordinating anion activators, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, 6-bound, metal ligand making the metal complex cationic and providing a charge-balancing non-coordinating or weakly coordinating anion.

4(a). Alumoxane Activators

Often, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkyl-alumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) co-catalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), the maximum amount of activator is typically selected at up to a 5000-fold molar excess Al/M over the catalyst compound (M =metal catalytic site). The minimum activator-to-catalyst compound is a 1:1 molar ratio. Alternate preferred ranges include from 1:1 to 500:1, alternately from 1:1 to 200:1, alternately from 1:1 to 100:1, or alternately from 1:1 to 50:1.

Alternatively, little or no alumoxane is used in the polymerization processes described herein. Alternately, alumoxane is present at zero mol %, alternately, the alumoxane is present at a molar ratio of aluminum to catalyst compound transition metal less than 500:1, preferably less than 300:1, preferably less than 100:1, preferably less than 1:1.

4(b). Non-Coordinating Anion Activators

The term "non-coordinating anion" (NCA) means an anion which either does not coordinate to a cation or which is only weakly coordinated to a cation by, for example, forming a tight ion pair, thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in the processes and systems disclosed herein are those that are compatible with and stabilize the transition metal cation in the sense of balancing its ionic charge at +1, and yet retain sufficient lability to permit displacement during polymerization.

The processes and methods disclosed herein may employ an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combinations thereof. Additionally or alternatively, one may use neutral or ionic activators alone or in combination with alumoxane or modified alumoxane activators.

Catalyst systems can include at least one non-coordinating anion (NCA) activator. Specifically, the catalyst systems include one or more NCAs, which either do not coordinate to a cation or which only weakly coordinate to a cation, thereby remaining sufficiently labile to be displaced during polymerization.

Preferably, boron-containing NCA activators represented by the formula below can be used:

$Z_d+(A^{d-})$ where Z is (L-H) or a reducible Lewis acid; L is a neutral Lewis base; H is hydrogen; (L-H) is a Bronsted acid; $A^{d-}$ is a boron-containing, non-coordinating anion having the charge d−; d is 1, 2, or 3. The cation component, $Z_d+$ may include Bronsted acids, such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d+$ may also be a moiety such as silver, tropylium, carboniums, ferroceniums and mixtures, preferably carboniums and ferroceniums. Most preferably $Z_d+$ is triphenyl carbonium. Preferred reducible Lewis acids can be any triaryl carbonium (where the aryl can be substituted or unsubstituted, such as those represented by the formula: ($Ar_3C+$), where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d+$ is the activating cation (L-H)$_d+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference. Illustrative, but not limiting examples of boron compounds, which may be used as an activating co-catalyst are the compounds described as (and particularly those specifically listed as) activators in U.S. Pat. No. 8,658,556, which is incorporated herein by reference. Most preferably, the ionic stoichiometric activator $Z_d+(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethyl-anilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenyl-carbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

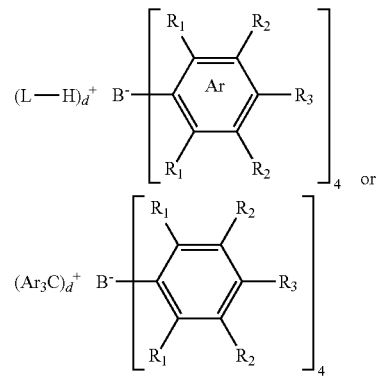

where each $R_1$ is, independently, a halide, preferably a fluoride;

Ar is a substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;

each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);

each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group);

wherein $R_2$ and $R_3$ can form one or more saturated or unsaturated, substituted or unsubstituted rings (preferably $R_2$ and $R_3$ form a perfluorinated phenyl ring); and L is a neutral Lewis base; (L-H)± is a Bronsted acid; d is 1, 2, or 3;

wherein the anion has a molecular weight of greater than 1020 g/mol;

wherein at least three of the substituents on the B atom each have a molecular volume of greater than 250 cubic Å, alternately greater than 300 cubic Å, or alternately greater than 500 cubic Å.

Preferably $(Ar_3C)_d+$ is $(Ph_3C)_d+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein. Alternatively, one or more of the NCA activators is chosen from the activators described in U.S. Pat. No. 6,211,105. Preferred activators include N,N-dimethylanilinium tetrakis(perfluoronaphthyl)borate, N,N-dimethylanilinium tetrakis(perfluorobiphenyl)borate, N,N-dimethylanilinium tetrakis (perfluorophenyl)borate, N,N-dimethylanilinium tetrakis(3,5-bis(trifluoromethyl) phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl) phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4(tris(pentafluorophenyl)borate)-2,3,5,6-tetrafluorophenyl) pyrrolidinium; and -tetrakis(pentafluorophenyl)borate, 4-(tris(pentafluorophenyl)borate)-2,3,5,6-tetrafluoropyridine.

Preferably, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis (perfluoronaphthyl)borate, triphenylcarbenium tetrakis(perfluorobiphenyl)borate, triphenyl-carbenium tetrakis(3,5-bis(trifluoromethyl)phenyl)borate). Alternatively, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkyl-ammonium tetrakis-(2,3,4,6-tetrafluorophenyl) borate, N,N-dialkylanilinium tetrakis-(2,3,4,6-tetrafluorophenyeborate, trialkylammonium tetrakis (perfluoronaphthyl)borate, N,N-dialkylanilinium tetrakis (perfluoronaphthyl)borate, trialkylammonium (perfluoro-biphenyl)borate, N,N-dialkylanilinium (perfluorobiphenyl)borate, trialkylammonium tetrakis(3,5-bis(trifluoromethyl)phenyl)borate, N,N-dialkylanilinium tetrakis(3,5-bis (trifluoromethyl)phenyl)borate, N,N-dialkyl-(2,4,6-trimethylanilinium) tetrakis(3,5-bis (trifluoromethyl)phenyl)borate, di-(i-propyl)ammonium tetrakis (pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1, and alternately from 1:1 to 1000:1. A particularly useful range is from 0.5:1 to 10:1, preferably 1:1 to 5:1. The catalyst compounds can be combined with combinations of alumoxanes and NCAs (see, for example, U.S. Pat. Nos. 5,153,157; 5,453,410; EP 0 573 120 B1; WO 94/07928; and WO 95/14044; which discuss the use of an alumoxane in combination with an ionizing activator).

5. Optional Scavengers and Chain Transfer Agents

Often, when using the complexes described herein, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group 13 organometallic compounds of U.S. Pat. Nos. 5,153,157; 5,241,025; WO 91/09882; WO 94/03506; WO 93/14132; and that of WO 95/07941. Exemplary compounds include alkyl aluminum compounds, such as triethylaluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum can be used. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Particularly useful scavengers are trialkyl- or triarylaluminum compounds, such as those represented by the formula: $AlR_3$, where R is a $C_1$ to $C_{20}$ group, such as a $C_1$ to $C_{20}$ alkyl or $C_1$ to $C_{20}$ aryl (such as methyl, ethyl, propyl, butyl, pentyl, hexyl, octyl, cyclopentyl, cyclohexyl, benzyl or phenyl groups and the like, including all their isomers, for example, tertiary butyl, isopropyl, and the like). Particularly useful scavengers include: trimethylaluminum, triethylaluminum, triisobutylaluminum, tri-n-hexylaluminum, tri-n-octylaluminum, and the like.

Chain transfer agents may also be used herein. Useful chain transfer agents that may also be used herein are typically a compound represented by the formula $AlR_3$, $ZnR_2$ (where each R is, independently, a $C_1$ to $C_{20}$, preferably $C_1$-$C_{20}$ alkyl or aryl radical, preferably methyl, ethyl, propyl, butyl, pentyl, hexyl, octyl, benzyl, phenyl, or an isomer thereof) or a combination thereof, such as diethyl zinc, trimethylaluminum, triisobutylaluminum, trinoctylaluminum, or a combination thereof. A combination of scavenger and chain transfer agent can also be useful, such as dialkyl zinc in combination with a trialkylaluminum. Diethylzinc in combination with one or more of trimethylaluminum, triisobutylaluminum, and tri-n-octylaluminum is also useful. Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl, octyl, or an isomer thereof) or a combination thereof, such as diethyl zinc, trimethylaluminum, triisobutylaluminum, trioctylaluminum, or a combination thereof.

6. Optional Support Materials

Often, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 μm. Most preferably, the surface area of the support material is in the range from about 100 to about 400 $m^2$/g, pore volume from about 0.8 to about 3.0 cc/g and average particle size is from about 5 to about 100 μm. The average pore size of the support material is in the range of from about 10 to 1000 Å, preferably 50 to about 500 Å, and most preferably 75 to about 350 Å. Often, the support material is a high surface area, amorphous silica (surface area=300 $m^2$/gm; pore volume of 1.65 $cm^3$/gm). Preferred silicas are marketed under the tradenames of DAVISON 948, DAVISON 952 or DAVISON 955 by the Davison Chemical Division of W.R. Grace and Company.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. Often, the slurry of the support material is first contacted with the activator for a period of time in the range of from about 0.5 hour to about 24 hours, from about 2 hours to about 16 hours, or from about 4 hours to about 8 hours. The solution of the catalyst compound is then contacted with the isolated support/activator. Often, the supported catalyst system is generated in situ (such as in the spiral heat exchanger). Alternatively, the slurry of the support material is first contacted with the catalyst compound for a period of time in the range of from about 0.5 hour to about 24 hours, from about 2 hours to about 16 hours, or from about 4 hours to about 8 hours. The slurry of the supported catalyst compound is then contacted with the activator solution.

The mixture of the catalyst, activator, and support is heated to about 0° C. to about 70° C., preferably to about 23° C. to about 60° C., preferably at room temperature. Contact times typically range from about 0.5 hour to about 24 hours, from about 2 hours to about 16 hours, or from about 4 hours to about 8 hours. The catalyst system may be dried and introduced into the spiral heat exchanger as a solid (such as a powder), suspended in mineral oil and introduced as a mineral oil slurry, combined with typical hydrocarbon solvent material (such as hexane, isopentane, etc.) and introduced as a suspension, or any other means typical in the art.

J. Additives

Other additives may also be used in the polymerization, as desired, such as one or more, scavengers, promoters, modifiers, chain transfer agents, co-activators, reducing agents, oxidizing agents, hydrogen, aluminum alkyls, or silanes. Aluminum alkyl compounds which may be utilized as scavengers or co-activators include, for example, one or more of those represented by the formula AlR3, where each R is, independently, a $C_1$-$C_8$ aliphatic radical, preferably methyl, ethyl, propyl, butyl, pentyl, hexyl, octyl, or an isomer thereof), especially trimethylaluminum, triethylaluminum, triisobutylaluminum, tri-n-hexylaluminum, tri-n-octylaluminum, or mixtures thereof.

Preferably, little or no scavenger is used in the process to produce the polymer, such as ethylene polymer. Preferably, scavenger (such as trialkyl aluminum, $AlR_3$ as defined above) is present at zero mol %, alternately the scavenger is present at a molar ratio of scavenger metal to transition metal of less than 100:1, preferably less than 50:1, preferably less than 15:1, preferably less than 10:1.

III. Process for Quenching a Polymerization Reaction

The invention further relates to processes for quenching a polymerization reaction. The process comprises introducing a quenching agent as described herein into a first effluent stream comprising polymer (e.g., polyethylene, polypropylene) exiting a polymerization zone to quench the polymerization reaction. The quenching agent may have a molecular weight, HLB and/or a hydroxyl value as described above. In particular, the quenching agent may have a molecular weight greater than about 200 daltons, greater than or equal to about 250 daltons, or greater than or equal to about 500 daltons; and at least one of:
  (i) a hydrophilic lipophilic balance (HLB) of less than about 20, less than about 18 or less than about 15; and
  (ii) a hydroxyl value of greater than about 100 mg KOH/g, greater than or equal to about 150 mg KOH/g, or greater than or equal to about 250 mg KOH/g.

Additionally or alternatively, the quenching agent may have both (i)-(ii).

The process may further comprise performing at least one separation step as described herein on the first effluent stream. In particular, a separation step may be performed in a first vessel on the first effluent stream under suitable conditions to produce a second effluent stream and a recycle stream. The separation may be performed in any suitable vessel, e.g., a flash vessel, high pressure flash vessel, etc. The second effluent stream may comprise polymer (e.g., polyolefin), which is substantially free of solvent, and the quenching agent. The recycle stream may comprise the solvent and unreacted hydrocarbon monomer. Preferably, the recycle stream is substantially free of the quenching agent. Optionally, the recycle stream may comprise the quenching agent in an insubstantial amount (e.g., less than 5.0 wppm based on the total concentration of the recycle stream). More preferably, the second effluent stream has a higher concentration of the quenching agent than the recycle stream. In various aspects, the separation step can be performed as a liquid-liquid separation as described herein (e.g., at a temperature of about 170° C. to about 230° C. and/or a pressure of about 400 psig to about 600 psig (2800 to 4100 kPag)) or a vapor liquid separation as described herein (e.g., at a temperature of about 80° C. to about 150° C. and/or a pressure of about 50 psig to about 300 psig (340 to 2100 kPag)).

Generally, the processes described using the quenching agents described herein can be simulated on a computer using process simulation software in order to generate process simulation data in a human-readable form (i.e., a computer printout or data displayed on a screen, a monitor, or other viewing device). The simulation data can then be used to manipulate the operation of the polymer production system and/or design the physical layout of a polymer production facility. Often, the simulation results can be used to design a new polymer production facility or expand an existing facility to integrate spiral heat exchanger(s). Often, the simulation results can be used to optimize the polymer production according to one or more operating parameters, such as varying the flow rate of the stripping agent. Examples of suitable software for producing the simulation results include commercial simulation software Aspen Plus v8.8 (34.0.0.110) with Aspen Polymers Module integrated from Aspen Technology, Inc., and PRO/II.RTM. from Simulation Sciences Inc.

EXAMPLES

Example 1

Comparison of Quenching Agents in Liquid Liquid Separation

The predicted partitioning of the quenching agents listed below in Table 1 is simulated using the commercialized simulation software Aspen Plus v8.8 (34.0.0.110) with Aspen Polymers Module integrated. The PC-SAFT thermodynamic model was used with parameters available in the software when available. Unary parameters not available in the software were estimated using the group contribution method (Sadowski, et al., *Industrial Engineering Chemical Research*, 2008, 47, pp. 5092-5101.) The simulation predicted the partitioning of the quench agent into the lean phase (recycle solvent) and rich phase (polymer) from a liquid-liquid separator, operated at 200° C. and 400 psig (2800 kPag). The feed solution is a poly(propylene-co-ethylene) in isohexane. The feed concentration of quench based on total feed rate was 100 wppm in all cases. The results are shown below in Table 1.

TABLE 1

| Quenching Agent | Lean Phase Concentration (wppm) | Rich Phase Concentration (wppm) |
| --- | --- | --- |
| water | 107 | 59 |
| decaglycerol tetraoleate | 0.9 | 749 |

As shown in Table 1, use of decaglycerol tetraoleate as the quenching agent will advantageously result in a small amount of decaglycerol tetraoleate remaining in the lean phase following a liquid-liquid separation. By comparison, using water as a quenching agent will result in a large amount of water remaining in the lean phase. This is undesirable since additional processing will be required to remove such an amount water from the lean phase so that the lean phase may be recycled back into the polymerization process.

Example 2

Comparison of Quenching Agents in Liquid Vapor Separation

The predicted partitioning of the quenching agents listed below in Table 2 is simulated using the commercialized simulation software Aspen Plus v8.8 (34.0.0.110) with Aspen Polymers Module integrated. The PC-SAFT thermodynamic model was used with parameters available in the software when available. Unary parameters not available in the software were estimated using the group contribution method (Sadowski, et al., *Industrial Engineering Chemical Research*, 2008, 47, pp. 5092-5101.) The simulation predicted partitioning of each quench agent into the liquid and vapor effluents from a flash drum, operated at 160° C. and 100 psig (690 kPag). The feed solution is a poly(propylene-co-ethylene) in isohexane. The feed concentration of quench based on total feed rate was 100 wppm in all cases. The addition of quench is 100 wppm in all cases, based on total feeds.

The results are shown below in Table 2.

TABLE 2

| Quench Agent | Liquid Phase Concentration (wppm) | Vapor Phase Concentration (wppm) |
| --- | --- | --- |
| water | 9 | 112 |
| glycerol monooleate | 866 | 0.09 |
| oleic acid diethanolamide | 867 | 0.02 |
| sorbitan monooleate | 867 | 0.003 |
| decaglycerol tetraoleate | 867 | trace |

As shown in Table 2, use of glycerol monooleate, oleic acid diethanolamide, sorbitan monooleate and decaglycerol tetraoleate as quenching agents will advantageously result in a small amount of quenching remaining in the vapor phase following a liquid-vapor separation. By comparison, using water as a quenching agent will result in a large amount of water remaining in the vapor phase. This is undesirable since additional processing will be required to remove such an amount water from the vapor phase so that the vapor phase may be recycled back into the polymerization process.

All documents described herein are incorporated by reference herein, including any priority documents and/or testing procedures to the extent they are not inconsistent with this text. As is apparent from the foregoing general description and the specific embodiments, while many specific embodiments have been illustrated and described, various modifications can be made without departing from the spirit and scope of the disclosure. Accordingly, it is not intended that the claimed invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements, and vice versa.

What is claimed is:

1. A process for producing a polymer, wherein the process comprises:
    polymerizing a hydrocarbon monomer dissolved in a solvent in the presence of a catalyst system under conditions to obtain a first effluent stream comprising a solution of the polymer and the solvent;
    introducing a quenching agent into the first effluent stream to quench the polymerization reaction, wherein the quenching agent comprises at least one fatty acid ester of polyglycerol and has a molecular weight ($M_n$) greater than about 200 daltons and at least one of:
    (i) a hydrophilic lipophilic balance (HLB) of less than about 20; and
    (ii) a hydroxyl value of greater than about 100 mg KOH/g.

2. The process of claim 1, further comprising:
    performing a separation on the first effluent stream to produce:
    a second effluent stream comprising the quenching agent; and a recycle stream comprising the solvent, unreacted hydrocarbon monomer and optionally, the quenching agent;
    wherein the second effluent stream has a higher concentration of the quenching agent than the recycle stream.

3. The process of claim 2, wherein less than about 5.0 wppm of the quenching agent is present in the recycle stream.

4. The process of claim 2, wherein the separation is a liquid-liquid separation.

5. The process of claim 4, wherein the quenching agent has a molecular weight ($M_n$) of greater than or equal to about 500 daltons and at least one of:
    (i) an HLB of less than about 15; and
    (ii) a hydroxyl value of greater than or equal to about 150 mg KOH/g.

6. The process of claim 5, wherein the quenching agent has (i)-(ii).

7. The process of claim 4, wherein the quenching agent has a molecular weight of greater than or equal to about 600 daltons.

8. The process of claim 4, wherein the quenching agent has an HLB of less than about 10 and/or has a hydroxyl value of greater than or equal to about 200 mg KOH/g.

9. The process of claim 1, wherein the fatty acid ester of polyglycerol is selected from the group consisting of decaglycerol tetraoleate, decaglycerol dipalmate, hexaglycerol distearate, and a combination thereof.

10. The process of claim 4, wherein the separation is performed at a temperature of about 170° C. to about 230° C. and a pressure of about 400 psig (2800 kPa) to about 600 psig (4100 kPa).

11. The process of claim 1, wherein the catalyst system comprises a coordination catalyst.

12. The process of claim 1, wherein the polymer comprises polyethylene and/or polypropylene.

13. The process of claim 1, wherein the hydrocarbon monomer comprises $C_2$-$C_{40}$ olefins and/or $C_1H_4$-$C_4H_{10}$ paraffins.

* * * * *